United States Patent
Komori et al.

(10) Patent No.: US 9,837,806 B1
(45) Date of Patent: Dec. 5, 2017

(54) SEAL STRUCTURE FOR MULTICORE CABLE, AND SEAL MEMBER

(71) Applicants: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

(72) Inventors: Hirokazu Komori, Mie (JP); Tomoyuki Sakata, Mie (JP); Makoto Higashikozono, Mie (JP); Masato Tsutsuki, Mie (JP)

(73) Assignees: AutoNetworks Technologies, Ltd., Yokkaichi, Mie (JP); Sumitomo Wiring Systems, Ltd., Yokkaichi, Mie (JP); Sumitomo Electric Industries, Ltd., Osaka-shi, Osaka (JP)

( * ) Notice: Subject to any disclaimer, the term of this patent is extended or adjusted under 35 U.S.C. 154(b) by 0 days.

(21) Appl. No.: 15/538,417

(22) PCT Filed: Dec. 15, 2015

(86) PCT No.: PCT/JP2015/085027
§ 371 (c)(1),
(2) Date: Jun. 21, 2017

(87) PCT Pub. No.: WO2016/104242
PCT Pub. Date: Jun. 30, 2016

(30) Foreign Application Priority Data

Dec. 25, 2014 (JP) .................................. 2014-262482

(51) Int. Cl.
*H02G 15/00* (2006.01)
*H02G 15/04* (2006.01)
(Continued)

(52) U.S. Cl.
CPC ............. *H02G 15/043* (2013.01); *H01B 7/18* (2013.01); *H01B 7/28* (2013.01); *H02G 15/013* (2013.01); *H01B 7/0009* (2013.01)

(58) Field of Classification Search
CPC ...... H02G 15/013; H02G 15/043; H01B 7/18; H01B 7/28; H01B 7/0009
(Continued)

(56) References Cited

U.S. PATENT DOCUMENTS 3,328,746 A * 6/1967 Schumacher ...... H01R 13/5205
439/587
3,913,206 A * 10/1975 Moulin .............. H05K 13/0007
29/235

(Continued)

FOREIGN PATENT DOCUMENTS

| JP | H0452387 U | 5/1992 |
|---|---|---|
| JP | H11329567 A | 11/1999 |
| JP | 2010218777 A | 9/2010 |

OTHER PUBLICATIONS

International Search Report for Application No. PCT/JP2015/085027, 8 pages.

*Primary Examiner* — William H Mayo, III
(74) *Attorney, Agent, or Firm* — Reising Ethington, P.C.

(57) ABSTRACT

A seal structure that includes: a multicore cable in which first to fourth electrical wires are enveloped by a sheath, the electrical wires extending out from an end portion of the sheath; a rubber plug through which the electrical wires pass, the rubber plug being fitted around the end portion of the sheath; a cap that is fitted around the rubber and presses the rubber plug inward; and a crimping member that is arranged adjacent to the rubber plug and is crimped around the sheath. The crimping member has a locking piece and a mating portion, and the cap has an extending piece and a receiving recession portion. Relative positions of the crimp- (Continued)

ing member and the rubber plug are held by the mating portion of the locking piece and the receiving recession portion of the extending piece locking together.

8 Claims, 28 Drawing Sheets

(51) Int. Cl.
  *H01B 7/18* (2006.01)
  *H01B 7/28* (2006.01)
  *H02G 15/013* (2006.01)
  *H01B 7/00* (2006.01)
(58) Field of Classification Search
  USPC .................. 174/74 R, 77 R, 78, 84 R, 88 R
  See application file for complete search history.

(56) References Cited

U.S. PATENT DOCUMENTS

| 4,527,851 | A | * | 7/1985 | Gallusser | ........... | H01R 13/5219 |
| | | | | | | 439/271 |
| 5,527,188 | A | * | 6/1996 | Ohtaka | .............. | H01R 13/5205 |
| | | | | | | 439/275 |

* cited by examiner

SEAL STRUCTURE FOR MULTICORE CABLE, AND SEAL MEMBER

CROSS REFERENCE TO RELATED APPLICATIONS

This application claims the priority of Japanese patent application JP2014-262482 filed on Dec. 25, 2014, the entire contents of which are incorporated herein.

TECHNICAL FIELD

The technology disclosed in the present specification relates to a seal structure for a multicore cable, and a seal member.

BACKGROUND ART

Conventionally, a rubber plug that has multiple electrical wire insertion holes for the passage of respective electrical wires is known as a method for waterproofing electrical wires collectively. The electrical wires and the rubber plug are sealed by close contact between the outer peripheries of the electrical wires and the inner peripheries of the electrical wire insertion holes.

SUMMARY

In the case where this type of rubber plug for a group of wires is to be attached to the terminal portion of a multicore cable in which multiple electrical wires are enveloped by a sheath, a configuration in which the rubber plug is provided with an integrated sheath covering portion that is to be fitted around the end portion of the sheath is conceivable as a hypothetical technique. Also, in order to further improve the seal between the multicore cable and the rubber plug, a configuration is conceivable in which a cap is fitted around the entirety of the rubber plug, and the rubber plug is pressed against the sheath and the electrical wires.

However, according to the hypothetical techniques described above, if the sheath is subjected to strong twisting force or the like from the outside, there is a risk that the sheath will become positionally shifted in the circumferential direction relative to the rubber plug, or the electrical wires will move inside the sheath and become twisted relative to the rubber plug, thus reducing the closeness of contact between the outer peripheries of the electrical wires and the inner peripheries of the electrical wire insertion holes, and degrading the seal between the rubber plug and the electrical wires.

The technology disclosed in the present specification was achieved in light of the above-described situation, and an object thereof is to provide a seal structure for a multicore cable and a seal member that enable improving the seal between a rubber plug and electrical wires.

A seal structure for a multicore cable disclosed in the present specification includes: a multicore cable in which a plurality of electrical wires are enveloped by a sheath, the plurality of electrical wires extending out from an end portion of the sheath; a rubber plug through which the plurality of electrical wires pass, the rubber plug being fitted around the end portion of the sheath; a cap that is fitted around the rubber plug and presses the rubber plug inward; and a crimping member that is arranged adjacent to the rubber plug and is crimped around the sheath, wherein the crimping member has a locking portion, and the cap has a locked portion, and relative positions of the crimping member and the rubber plug are held by the locking portion and the locked portion locking together.

Also, a seal member disclosed in the present specification is a seal member for attachment to a multicore cable in which a plurality of electrical wires are enveloped by a sheath, the plurality of electrical wires extending out from an end portion of the sheath, the seal member including: a rubber plug through which the plurality of electrical wires pass, the rubber plug being fitted around the end portion of the sheath; a cap that is fitted around the rubber plug and presses the rubber plug inward; and a crimping member that is arranged adjacent to the rubber plug and is crimped around the sheath, wherein the crimping member has a locking portion, and the cap has a locked portion, and relative positions of the crimping member and the cap are held by the locking portion and the locked portion locking together.

According to the technology disclosed in the present specification, the cap is fitted around the rubber plug and presses the rubber plug inward, and therefore the relative positions of the cap and the rubber plug are held. Also, the crimping member crimps the sheath, and therefore the relative positions of the crimping member and the sheath are held. Moreover, in the portion of the sheath that is crimped by the crimping member, the electrical wires are held by the crimping member so as to not move inside the sheath.

Also, the relative positions of the cap and the crimping member are held by the locked portion and the locking portion locking together, therefore indirectly holding the relative positions of the rubber plug held by the cap and the sheath crimped by the crimping member, and thus the sheath and the electrical wire as well. Accordingly, even if strong twisting force or the like acts on the sheath from the outside, the seal between the rubber plug and the electrical wires can be kept in a favorable state.

The seal structure for a multicore cable and the seal member may have the following configurations.

A configuration is possible in which the crimping member includes a main body portion that crimps the sheath, and the locking portion is a locking piece that extends from the main body portion toward the cap, the locked portion is a receiving recession portion into which the locking piece is fitted, and rotation of the crimping member and the cap is prevented by the locking piece and the receiving recession portion locking together.

According to the above aspect, the configuration is simple, and the locking piece of the crimping member can be easily aligned with and fitted into the receiving recession portion of the cap in order to attach the main body portion to the sheath. Also, rotation of the crimping member and the cap is prevented, thus suppressing twisting of the electrical wires relative to the rubber plug.

A configuration is possible in which the crimping member includes a main body portion that crimps the sheath and is shaped as a tube having a C-shaped cross-section that conforms to an outer periphery of the sheath.

Also, a configuration is possible in which the crimping member includes a main body portion that crimps the sheath by being pressed so as to wrap around an outer periphery of the sheath.

According to the technology disclosed in the present specification, it is possible to improve the seal between a rubber plug and multiple electrical wires extending out from a multicore cable.

DESCRIPTION OF EMBODIMENTS

Figure 1:
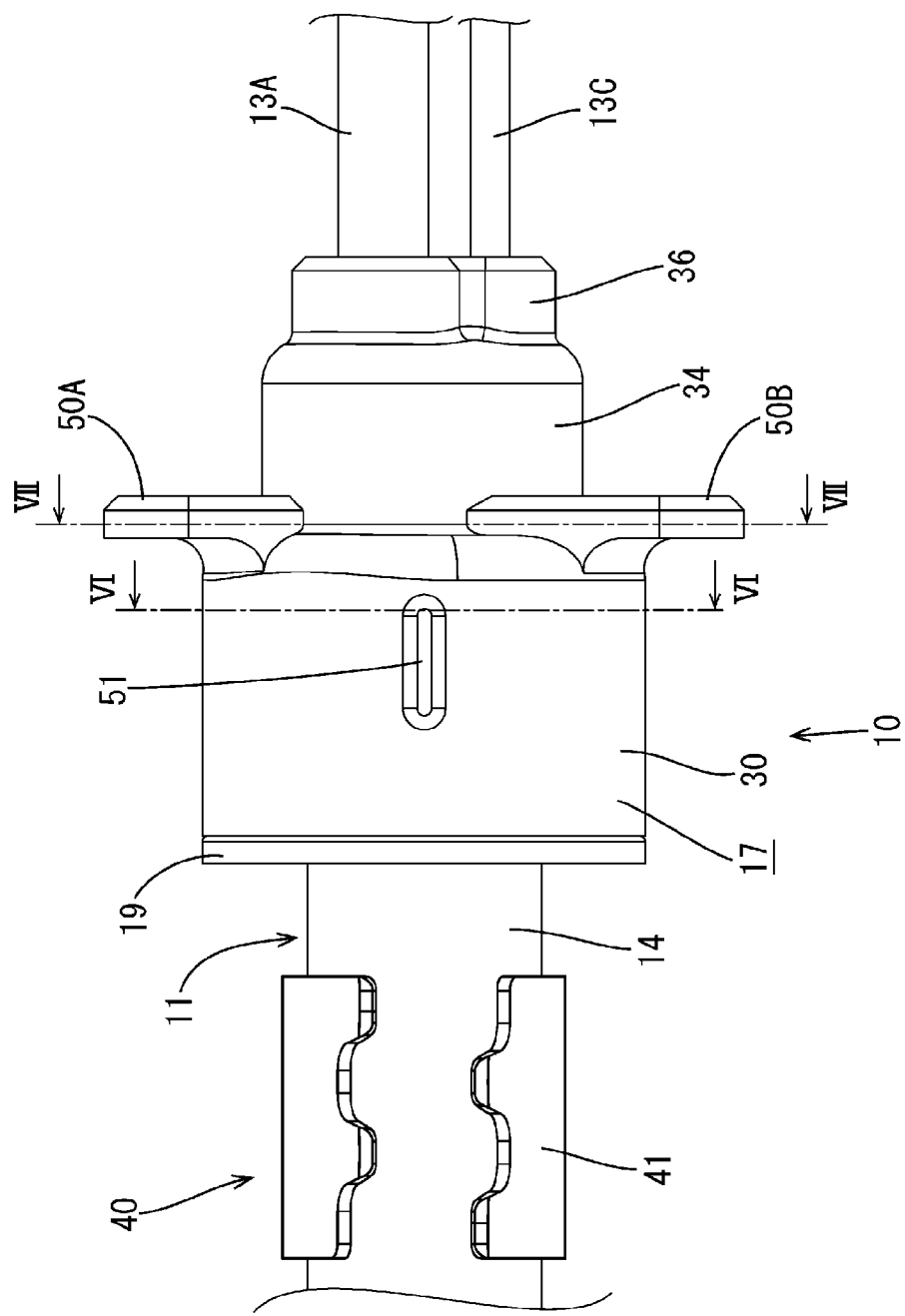
FIG. 1 is a plan view showing a seal structure for a multicore cable and a seal member according to a first embodiment.

A first embodiment will be described below with reference to FIGS. 1 to 26. The present embodiment can be applied to a wire harness for an electrical parking brake that is installed in a vehicle (not shown), for example. Note that in the following description, the right side in FIG. 1 is considered to be the frontward direction, and the left side is considered to be the rearward direction. Also, the upper side in FIG. 3 is considered to be the upward direction, and the lower side is considered to be the downward direction. Furthermore, in the case of multiple members that are the same, there are cases where only some of the members are denoted by reference signs, and reference signs are not shown for the other members.

As shown in FIGS. 3 to 4 and 16 to 18, a multicore cable 11 according to the present embodiment has a configuration in which multiple (four in the present embodiment) electrical wires 13A, 13B, 13C, and 13D are enveloped by a sheath 14 that is made of an insulating synthetic resin. The electrical wires 13A, 13B, 13C, and 13D have a configuration in which the outer periphery of a metal core wire (not shown) is covered by a synthetic resin insulating covering (not shown). The multicore cable 11 has a circular cross-sectional shape. Hereinafter, the electrical wires 13A, 13B, 13C, and 13D will be referred to as the electrical wires 13 when no distinction is made between them.

Figure 6:
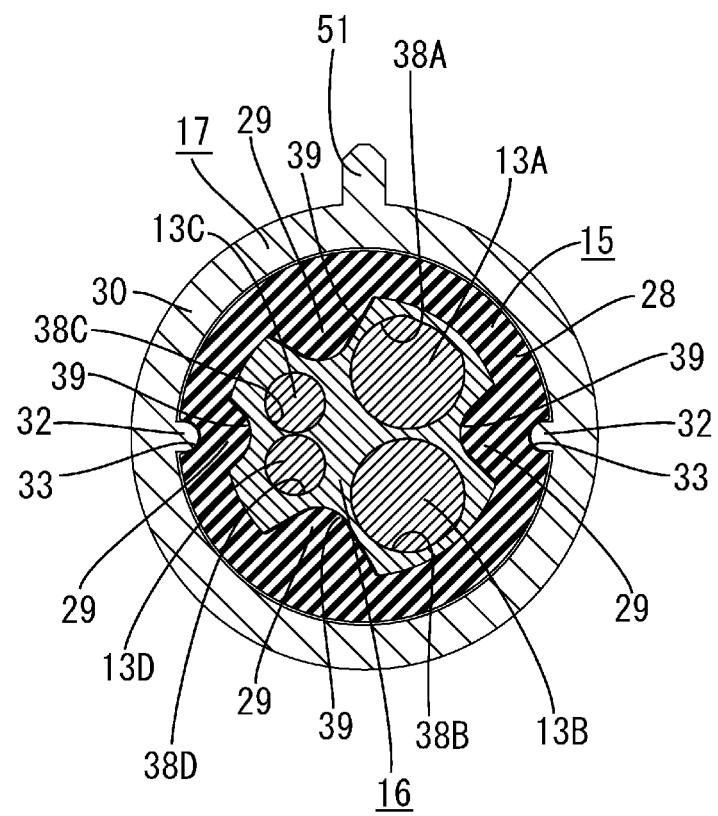
FIG. 6 is a cross-sectional view taken along line VI-VI in FIG. 1.
Figure 7:
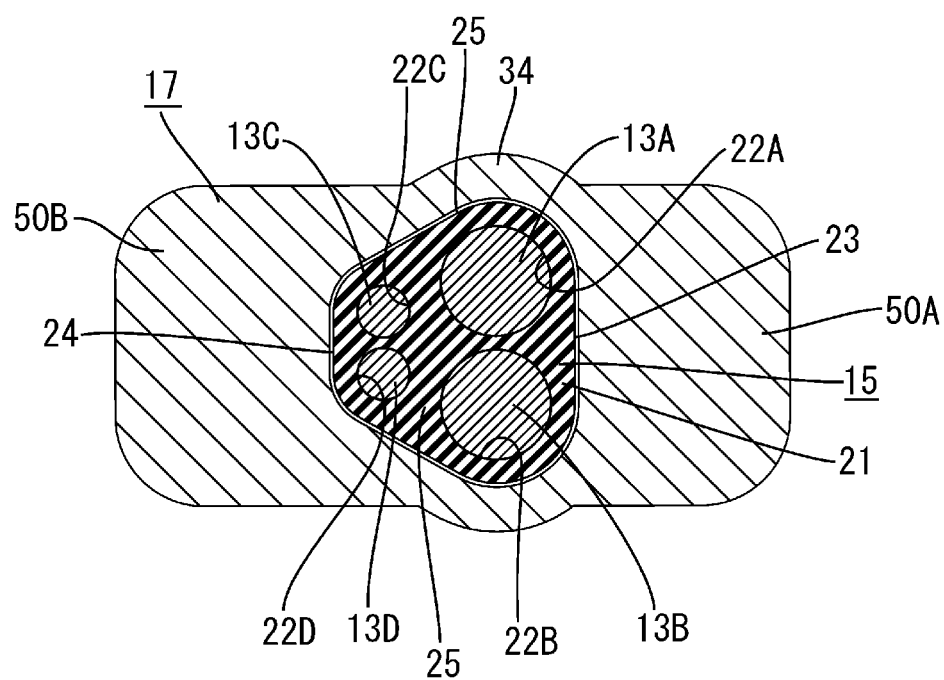
FIG. 7 is a cross-sectional view taken along line VII-VII in FIG. 1.

As shown in FIGS. 6 to 7, the four electrical wires 13A, 13B, 13C, and 13D include two types of electrical wires 13A, 13B, 13C, and 13D that have different outer diameter dimensions. In the present embodiment, the first electrical wire 13A and the second electrical wire 13B are for connection to an electrical parking brake motor, and the third electrical wire 13C and the fourth electrical wire 13D are for an anti-lock brake system sensor. The first electrical wire 13A, the second electrical wire 13B, the third electrical wire 13C, and the fourth electrical wire 13D have a circular cross-section.

The outer diameter dimensions of the first electrical wire 13A and the second electrical wire 13B are set larger than the outer diameter dimensions of the third electrical wire 13C and the fourth electrical wire 13D. The outer diameter dimension of the first electrical wire 13A is set the same as the outer diameter dimension of the second electrical wire 13B. Also, the outer diameter dimension of the third electrical wire 13C is set the same as the outer diameter dimension of the fourth electrical wire 13D. The first electrical wire 13A, the second electrical wire 13B, the third electrical wire 13C, and the fourth electrical wire 13D extend and branch out from an end portion 14A of the sheath 14 of the multicore cable 11.

As shown in FIGS. 1 to 4, the seal member 10 is attached to the end portion 14A of the sheath 14 of the multicore cable 11, specifically to the region in which the first electrical wire 13A, the second electrical wire 13B, the third electrical wire 13C, and the fourth electrical wire 13D are branched. The intrusion of a liquid such as water or oil through the end portion 14A of the sheath 14 into the sheath 14 is suppressed by the seal member 10. The seal member 10 includes a rubber plug 15 that is attached to the end portion 14A of the sheath 14, a guide member 16 that is attached to the interior of the rubber plug 15, a cap 17 that is fitted around the rubber plug 15, and a crimping member 40 that is fitted around the sheath 14 at a position that is toward the end portion of the sheath 14 and is adjacent to the rubber plug 15.

Figure 3:
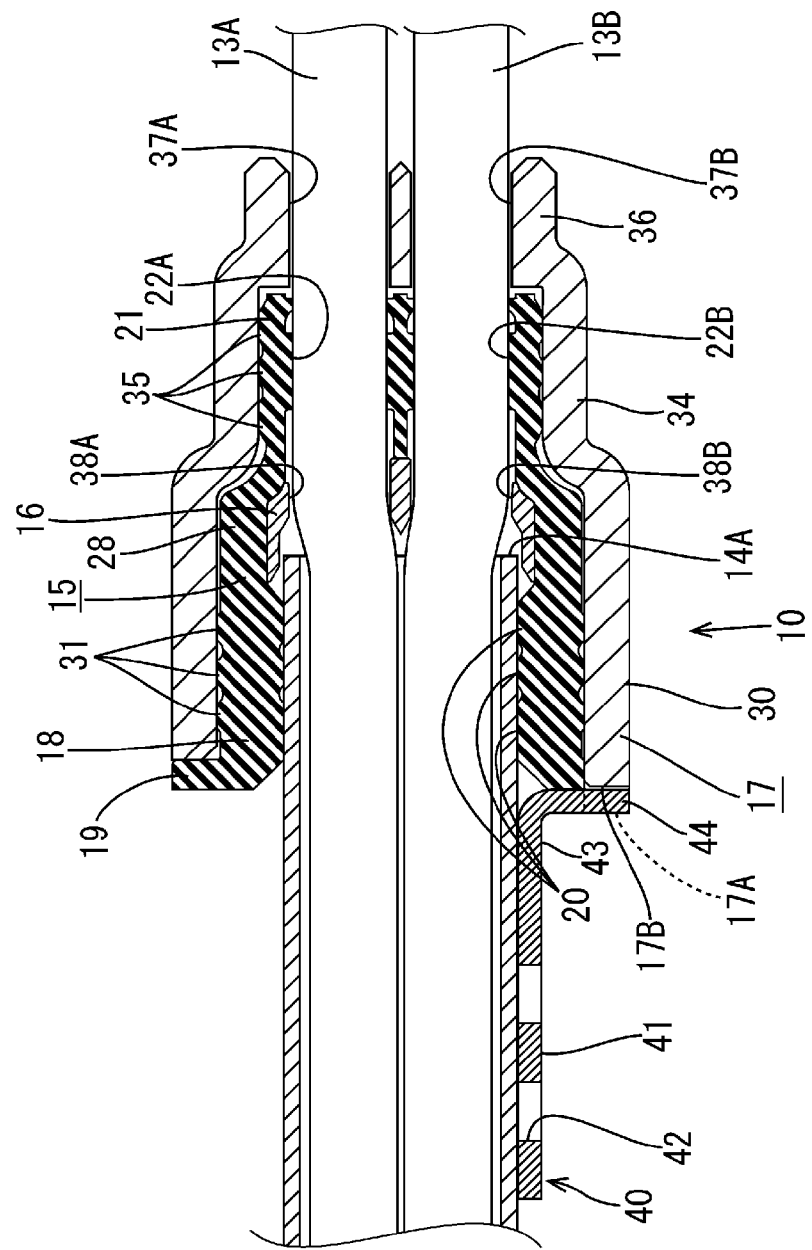
FIG. 3 is a cross-sectional view taken along line III-III in FIG. 5.
Figure 4:
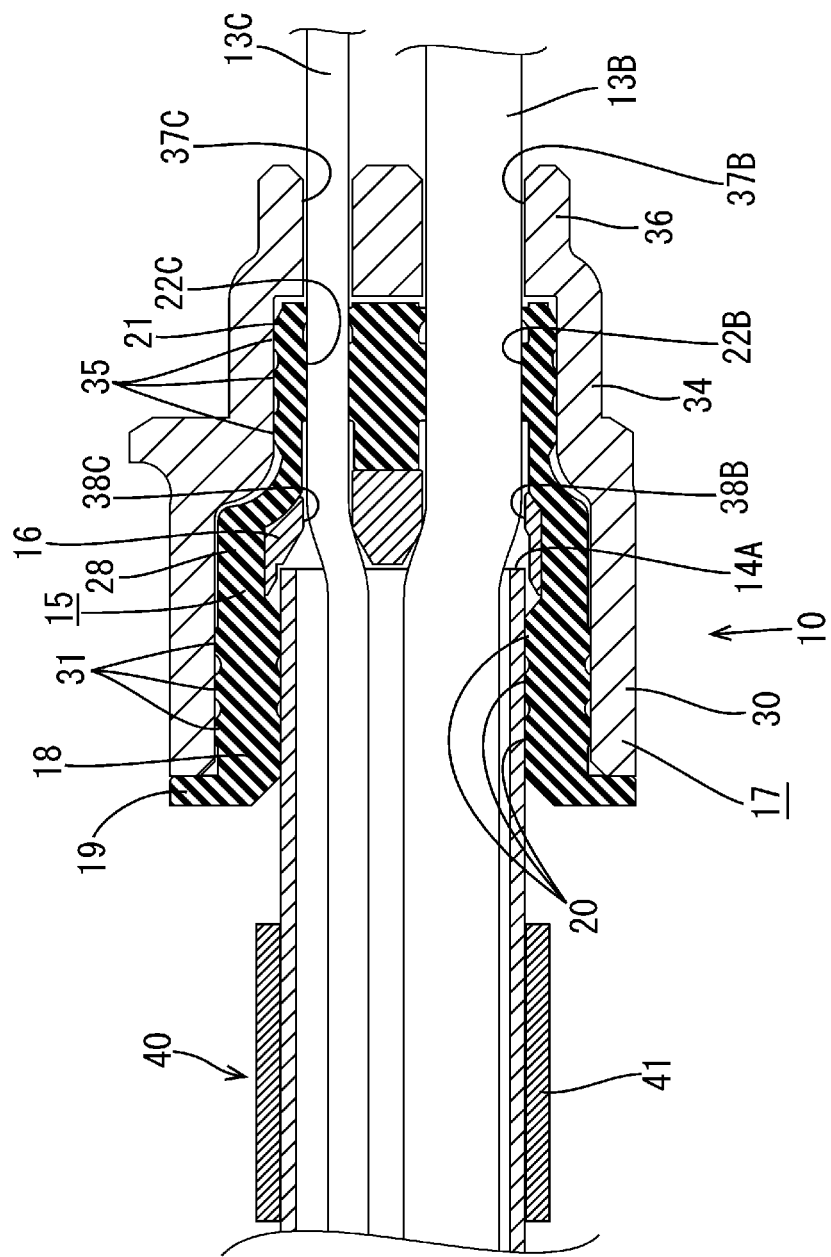
FIG. 4 is a cross-sectional view taken along line IV-IV in FIG. 5.

As shown in FIGS. 3 and 4, the rubber plug 15 is attached to the end portion 14A of the sheath 14. The rubber plug 15 has a sheath covering portion 18 that is fitted around the end portion 14A of the sheath 14. The sheath covering portion 18 is shaped as a hood that is open toward the rear side (the left side in FIG. 3). The sheath covering portion 18 is substantially shaped as a circular tube in its natural state. A flange portion 19 that protrudes outward in the diameter direction of the sheath covering portion 18 is formed at an end edge portion on the rear side of the sheath covering portion 18 (see FIGS. 8 and 9). A notch portion 19A for passage of a later-described extending piece 17A of the cap 17 is provided in a portion of the flange portion 19 (see FIGS. 10 and 11).

Figure 11:
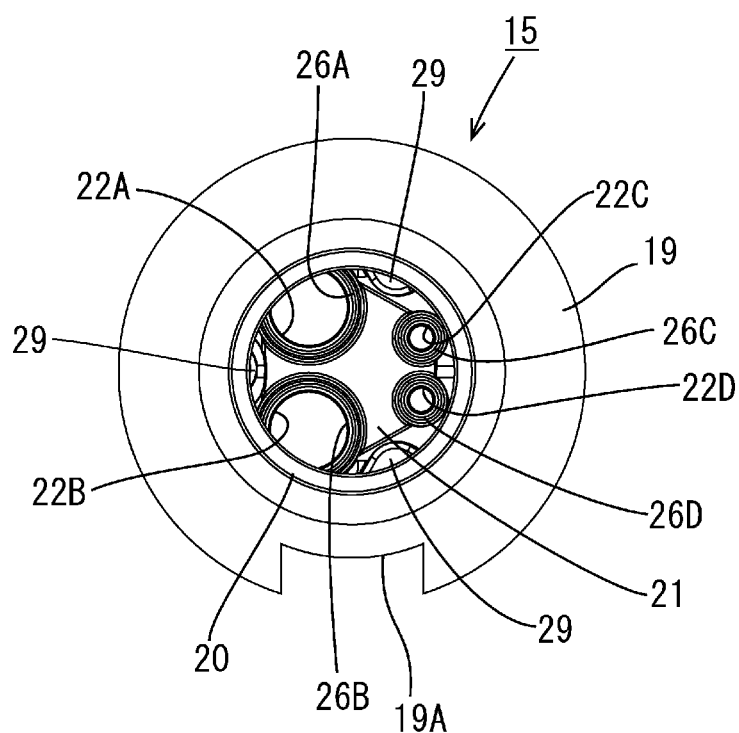
FIG. 11 is a back view showing the rubber plug.

As shown in FIGS. 3, 4, and 11, multiple sheath-side lips 20 that protrude inward are formed as rings that extend along the circumferential direction of the sheath covering portion 18 on the inner periphery of the sheath covering portion 18. In the state where the sheath covering portion 18 is fitted around the end portion 14A of the sheath 14, the sheath-side lips 20 are in close contact with the outer periphery of the sheath 14. This seals the rubber plug 15 and the sheath 14.

Figure 10:
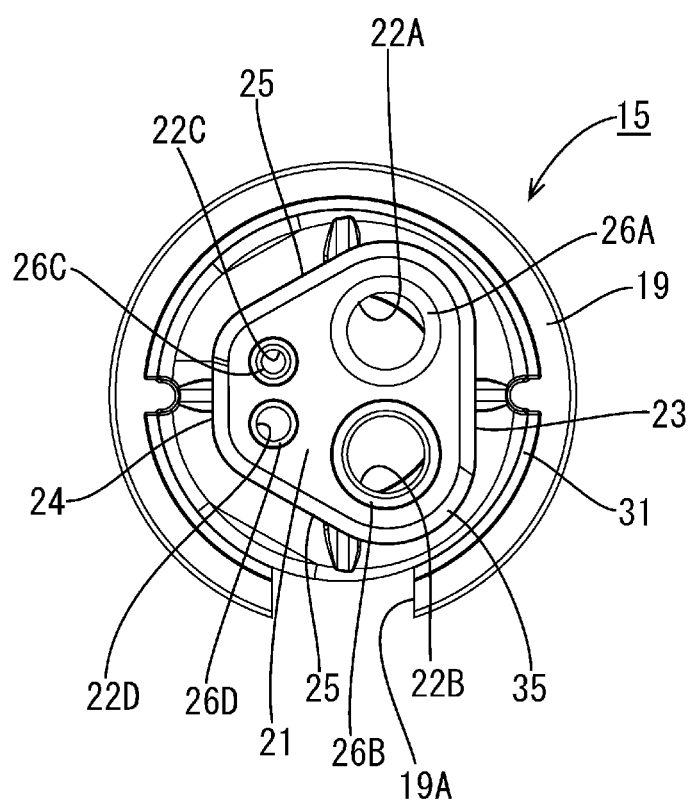
FIG. 10 is a front view showing the rubber plug.

As shown in FIGS. 3, 4, and 10, an electrical wire through-hole portion 21 is provided at the end portion on the front side (right side in FIG. 3) of the rubber plug 15, and the electrical wire through-hole portion 21 has multiple (four in the present embodiment) through-holes 22A, 22B, 22C, and 22D for passage of the first electrical wire 13A, the second electrical wire 13B, the third electrical wire 13C, and the fourth electrical wire 13D respectively. The through-holes 22A, 22B, 22C, and 22D include a first through-hole 22A for passage of the first electrical wire 13A, a second through-hole 22B for passage of the second electrical wire 13B, a third through-hole 22C for passage of the third electrical wire 13C, and a fourth through-hole 22D for passage for the fourth electrical wire 13D.

As shown in FIGS. 7 and 10, the cross-sectional shape of the electrical wire through-hole portion 21 is a trapezoid having rounded corners. The cross-sectional shape of the electrical wire through-hole portion 21 includes a long side 23 that extends in the up-down direction, a short side 24 that is shorter than the long side 23 and is parallel with the long side 23, and two inclined sides 25 that connect end portions of the long side 23 to end portions of the short side 24.

The first through-hole 22A and the second through-hole 22B are formed side-by-side along the extending direction of the long side 23 (up-down direction) at positions in the electrical wire through-hole portion 21 that are biased toward the long side 23. Also, the third through-hole 22C and the fourth through-hole 22D are formed side-by-side along the extending direction of the short side 24 (up-down direction) at positions in the electrical wire through-hole portion 21 that are biased toward the short side 24.

Figure 8:
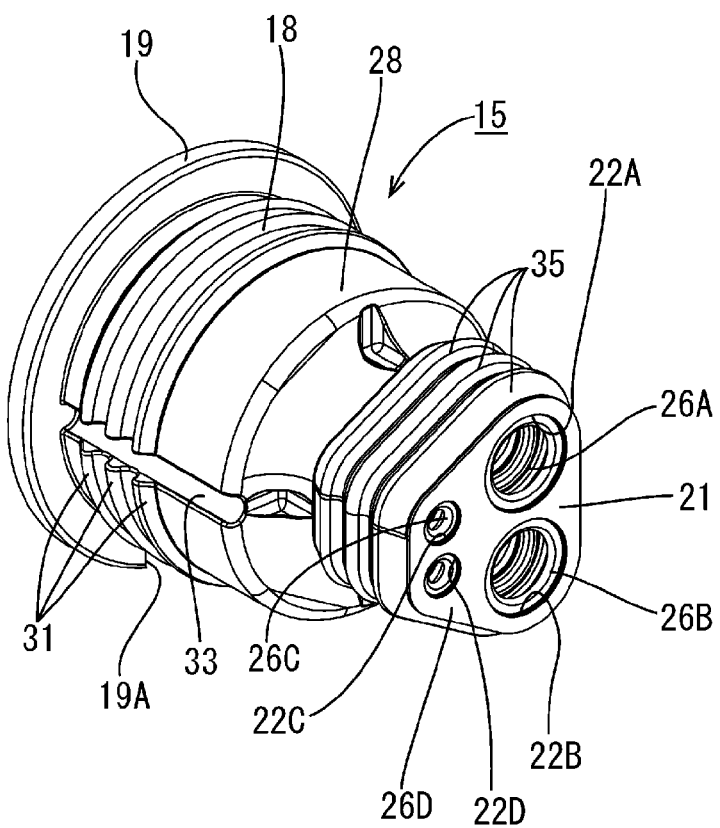
FIG. 8 is a perspective view showing a rubber plug.

The inner diameter dimension of the first through-hole 22A is somewhat larger than the outer diameter dimension of the first electrical wire 13A. As shown in FIGS. 8 and 10, first electrical wire-side lips 26A (one example of an electrical wire-side lip) that come into close contact with the outer periphery of the first electrical wire 13A are formed as rings that extend along the circumferential direction of the first through-hole 22A on the inner periphery of the first through-hole 22A. In the state where the first electrical wire 13A passes through the interior of the first through-hole 22A, the first electrical wire-side lips 26A are in close contact with the outer periphery of the first electrical wire 13A. This seals the first electrical wire 13A and the rubber plug 15.

The inner diameter dimension of the second through-hole 22B is somewhat larger than the outer diameter dimension of the second electrical wire 13B. As shown in FIGS. 8 and 10, second electrical wire-side lips 26B (one example of an electrical wire-side lip) that come into close contact with the outer periphery of the second electrical wire 13B are formed as rings that extend along the circumferential direction of the second through-hole 22B on the inner periphery of the second through-hole 22B. In the state where the second electrical wire 13B passes through the interior of the second through-hole 22B, the second electrical wire-side lips 26B are in close contact with the outer periphery of the second electrical wire 13B. This seals the second electrical wire 13B and the rubber plug 15.

The inner diameter dimension of the third through-hole 22C is somewhat larger than the outer diameter dimension of the third electrical wire 13C. As shown in FIGS. 8 and 10, third electrical wire-side lips 26C (one example of an electrical wire-side lip) that come into close contact with the outer periphery of the third electrical wire 13C are formed as rings that extend along the circumferential direction of the third through-hole 22C on the inner periphery of the third through-hole 22C. In the state where the third electrical wire 13C passes through the interior of the third through-hole 22C, the third electrical wire-side lips 26C are in close contact with the outer periphery of the third electrical wire 13C. This seals the third electrical wire 13C and the rubber plug 15.

The inner diameter dimension of the fourth through-hole 22D is somewhat larger than the outer diameter dimension of the fourth electrical wire 13D. As shown in FIGS. 8 and 10, fourth electrical wire-side lips 26D (one example of an electrical wire-side lip) that come into close contact with the outer periphery of the fourth electrical wire 13D are formed as rings that extend along the circumferential direction of the fourth through-hole 22D on the inner periphery of the fourth through-hole 22D. In the state where the fourth electrical wire 13D passes through the interior of the fourth through-hole 22D, the fourth electrical wire-side lips 26D are in close contact with the outer periphery of the fourth electrical wire 13D. This seals the fourth electrical wire 13D and the rubber plug 15.

As shown in FIGS. 3 and 4, a holding portion 28 for holding the later-described guide member 16 is formed at a position on the rubber plug 15 that is inside the sheath covering portion 18 and between the sheath-side lips 20 and the electrical wire through-hole portion 21, and the holding portion 28 has multiple (four in the present embodiment) guide holes 38A, 38B, 38C, and 38D for passage of the first electrical wire 13A, the second electrical wire 13B, the third electrical wire 13C, and the fourth electrical wire 13D respectively.

As shown in FIGS. 3 and 4, the cap 17 is made of a synthetic resin and is fitted around the rubber plug 15. The cap 17 is open toward the rear side (left side in FIG. 3), and is fitted around the rubber plug 15 from the front side (right side in FIG. 3).

Figure 13:
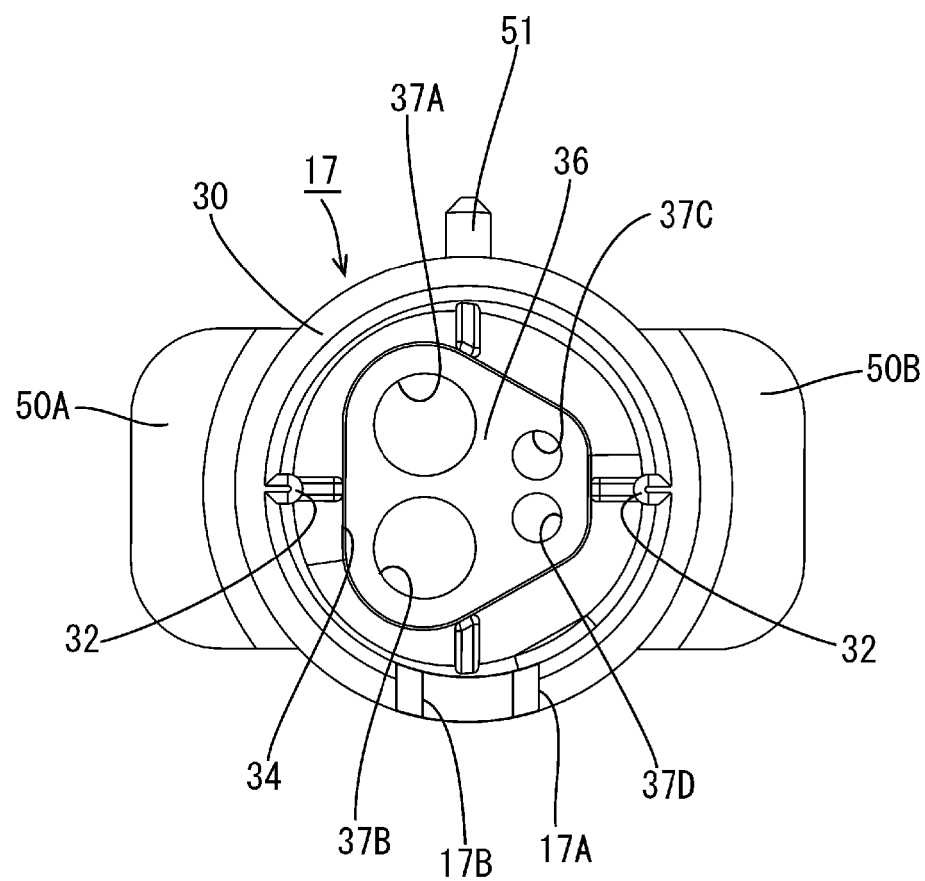
FIG. 13 is a back view showing the cap.

The open side (left side in FIG. 3) of the cap 17 is a wide portion 30 that is fitted around the sheath covering portion 18 of the rubber plug 15. As shown in FIGS. 6 and 13, the cross-sectional shape of the wide portion 30 is a circle that conforms to the outer shape of the sheath covering portion 18.

Figure 9:
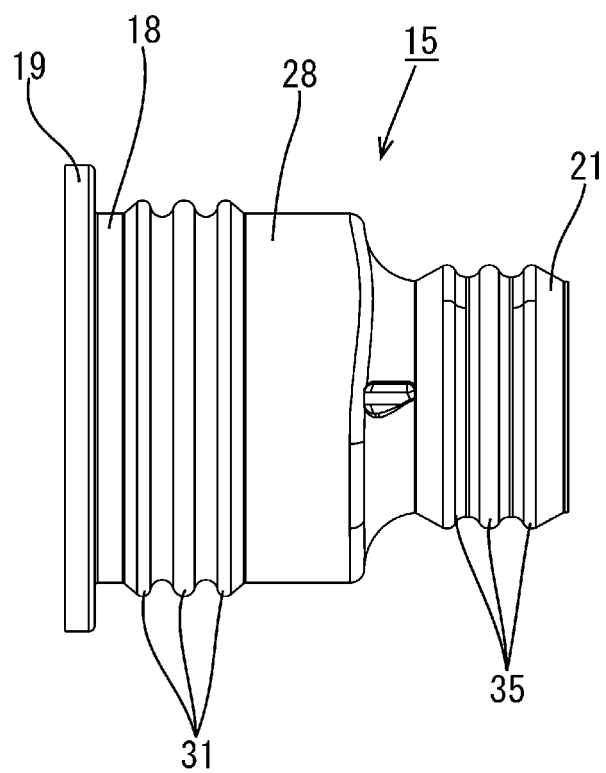
FIG. 9 is a plan view showing the rubber plug.

As shown in FIGS. 3 and 4, the inner periphery of the wide portion 30 comes into close contact with multiple (three in the present embodiment) wide portion-side lips 31 that are formed on the outer periphery of the sheath covering portion 18. As shown in FIGS. 8 and 9, the wide portion-side lips 31 are formed on the outer peripheral surface of the sheath covering portion 18 so as to protrude outward and extend along the circumferential direction of the sheath covering portion 18. When the wide portion-side lips 31 and the inner periphery of the wide portion 30 of the cap 17 are in close contact, the wide portion 30 of the cap 17 and the sheath covering portion 18 of the rubber plug 15 are sealed.

Also, as shown in FIGS. 6 and 13, multiple (two in the present embodiment) rubber plug locking portions 32, which are shaped as ribs that extend along the opening direction of the cap 17, are formed on the inner portion of the wide portion 30 of the cap 17. The two rubber plug locking portions 32 are formed at positions that oppose each other on the inner periphery of the wide portion 30.

As shown in FIGS. 6 and 8, two rubber plug locked portions 33, into which the multiple (two in the present embodiment) rubber plug locking portions 32 are fitted, are formed as groove-shaped recessions along the extending direction of the sheath covering portion 18 in the outer periphery of the sheath covering portion 18 and the holding portion 28 of the rubber plug 15. The two rubber plug locked portions 33 are formed at positions that respectively correspond to the two rubber plug locking portions 32 formed on the wide portion 30.

When the rubber plug locking portions 32 of the wide portion 30 lock to the rubber plug locked portions 33 of the sheath covering portion 18, rotation of the rubber plug 15 in the circumferential direction of the rubber plug 15 relative to the cap 17 is suppressed.

As shown in FIGS. 3 and 4, in the state where the wide portion 30 of the cap 17 is fitted around the sheath covering portion 18 of the rubber plug 15, the wide portion 30 presses the sheath covering portion 18 inward in the diameter direction of the sheath covering portion 18. Accordingly, the sheath covering portion 18 is pressed against the outer periphery of the sheath 14 from the outside. Accordingly, the sheath-side lips 20 of the sheath covering portion 18 reliably come into close contact with the outer periphery of the sheath 14.

Figure 2:
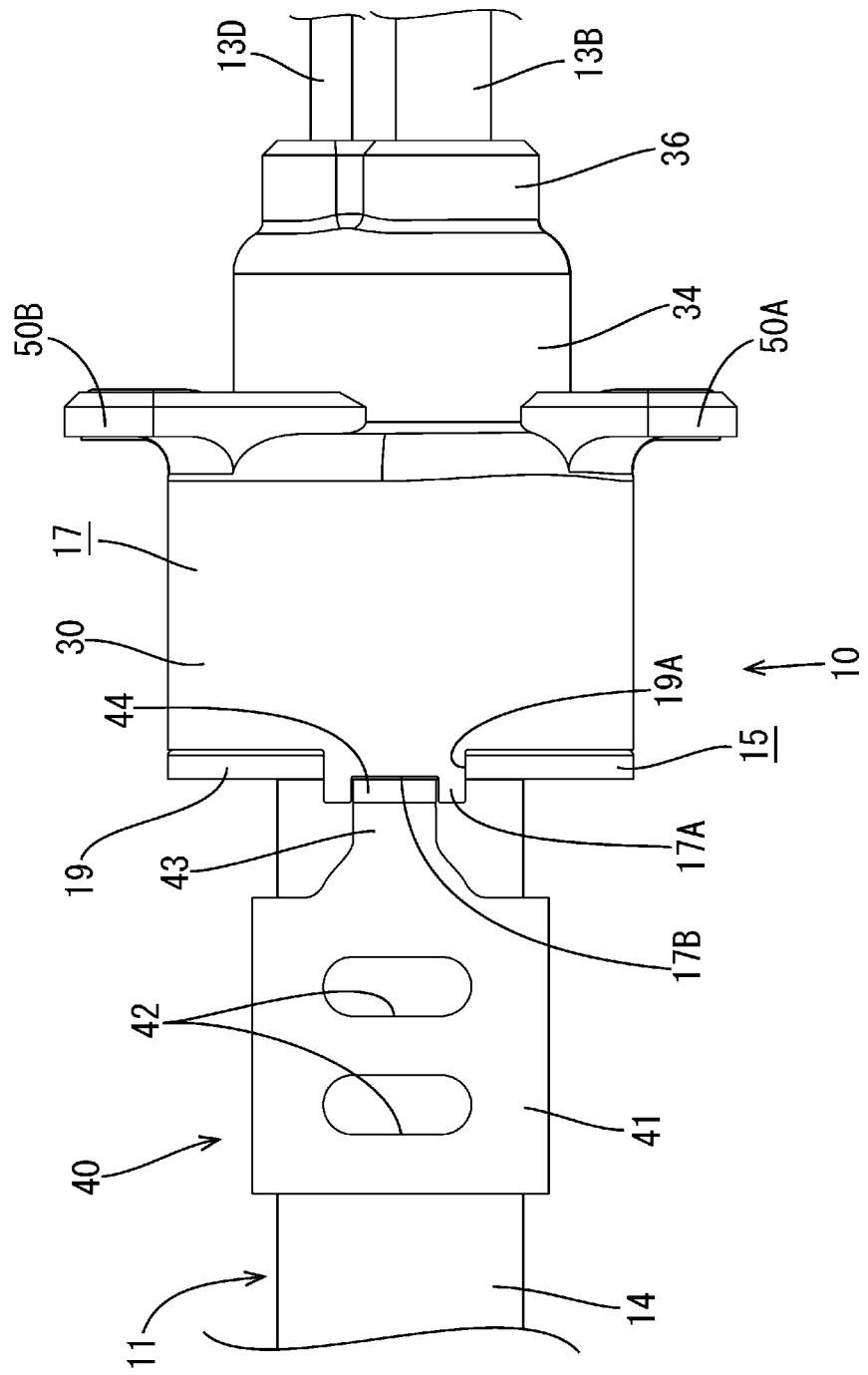
FIG. 2 is a bottom view showing the seal structure for a multicore cable and the seal member.
Figure 24:
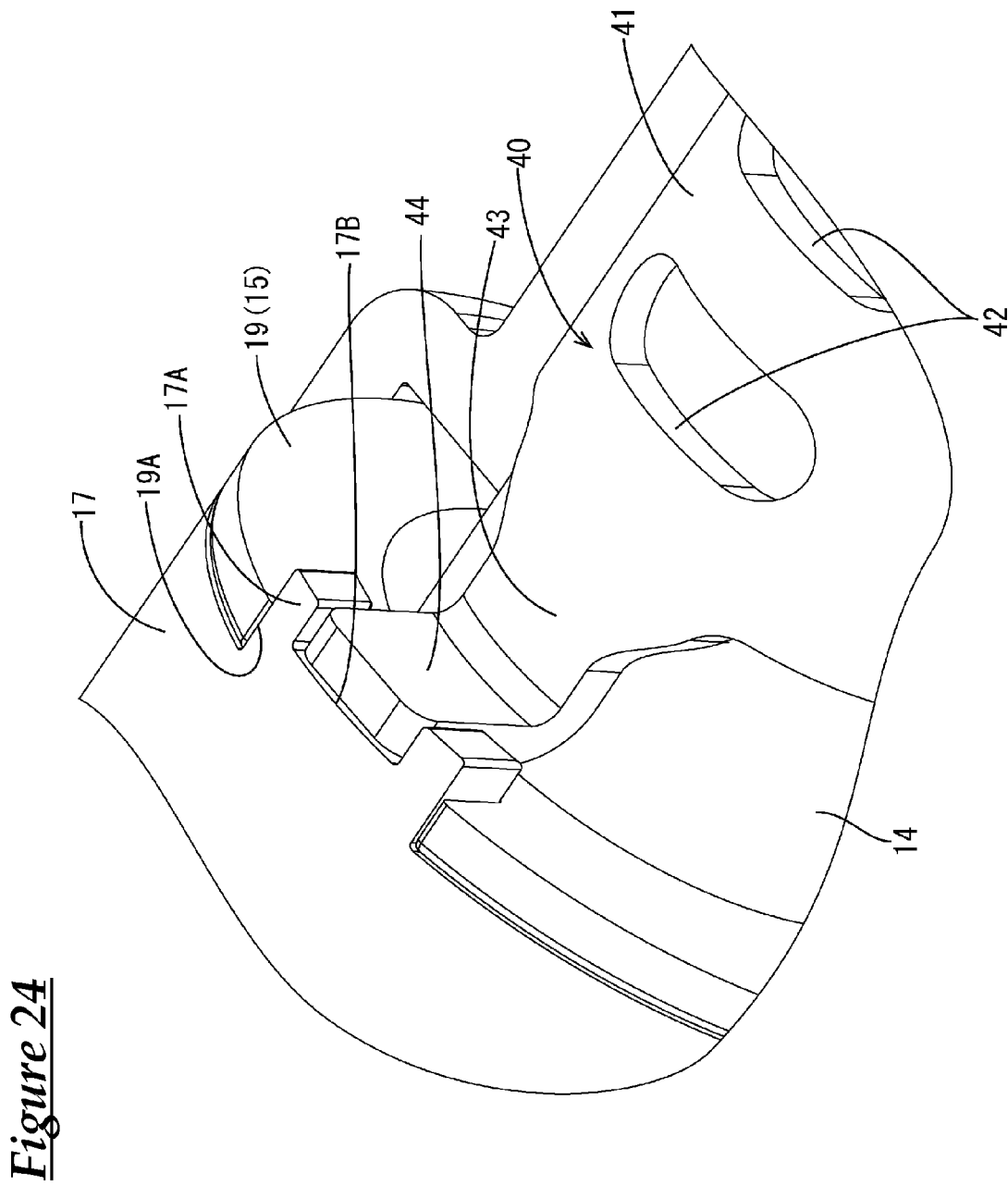
FIG. 24 is an enlarged perspective view showing a relevant portion in a state in which a mating portion has been fitted into a receiving recession portion.

An extending piece 17A that extends toward the rear side is provided on a portion (lower end portion) of the opening edge on the rear side of the cap 17 (wide portion 30) (see FIGS. 2 and 24). This extending piece 17A extends to the sheath 14 side (rear side) through the above-described notch portion 19A of the rubber plug 15. Accordingly, rotation of the cap 17 in the circumferential direction of the rubber plug 15 relative to the rubber plug 15 is suppressed. The portion of the opening edge of the cap 17 (wide portion 30) other than the extending piece 17A abuts against the flange portion 19 of the rubber plug 15 (see FIG. 4).

The inner peripheral surface of the extending piece 17A is shaped as a curved surface that is flush with the inner peripheral surface of the wide portion 30, and the outer peripheral surface is shaped as a curved surface that is flush with the outer peripheral surface of the wide portion 30. The extending dimension of the extending piece 17A is substantially equal to the sum of the thickness dimension of the flange portion 19 and the plate thickness of the mating portion 44 (locking piece 43) of the crimping member 40, and the leading edge in the protruding direction (the end edge portion on the rear side in the present embodiment) protrudes to the sheath 14 side (rear side) beyond the flange portion 19 of the rubber plug 15 (see FIGS. 2 and 24).

Also, the leading end surface in the extending direction of the extending piece 17A is cut into a receding shape from the sheath 14 side (rear side), thus forming a receiving recession portion 17B into which a later-described locking piece 43 (mating portion 44) of the crimping member 40 is fitted. The cutout depth of the receiving recession portion 17B is substantially equal to the plate thickness of the later-described locking piece 43 (mating portion 44) of the crimping member 40. When the locking piece 43 (mating portion 44) is fitted into the receiving recession portion 17B, rotation of the crimping member 40 in the circumferential direction relative to the cap 17 is suppressed.

Figure 5:
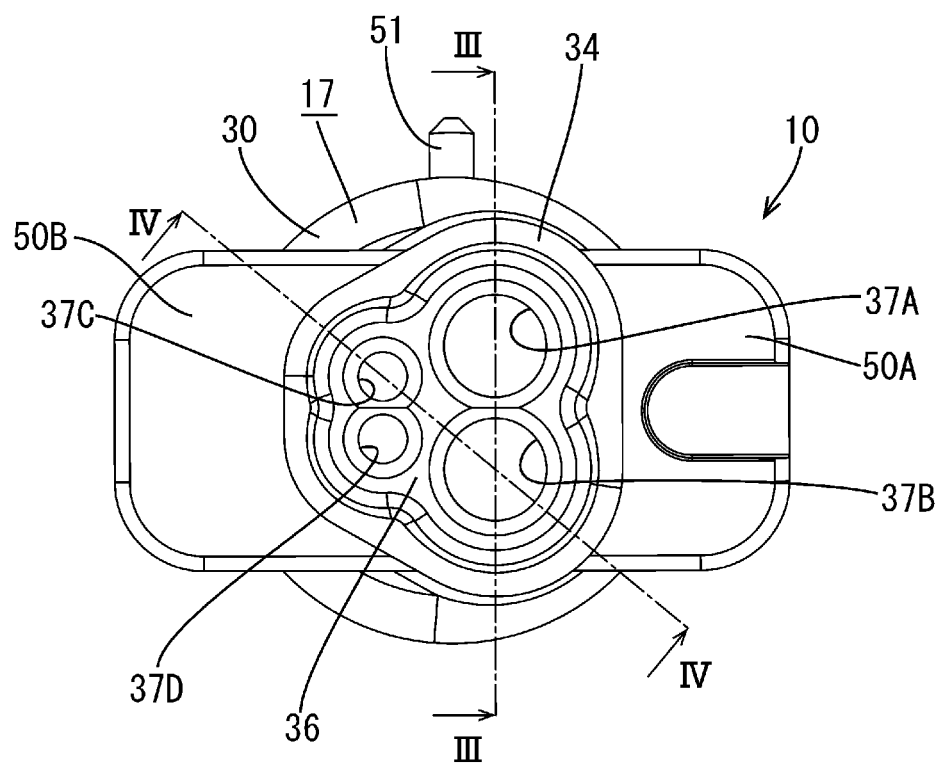
FIG. 5 is a front view showing the seal member.
Figure 12:
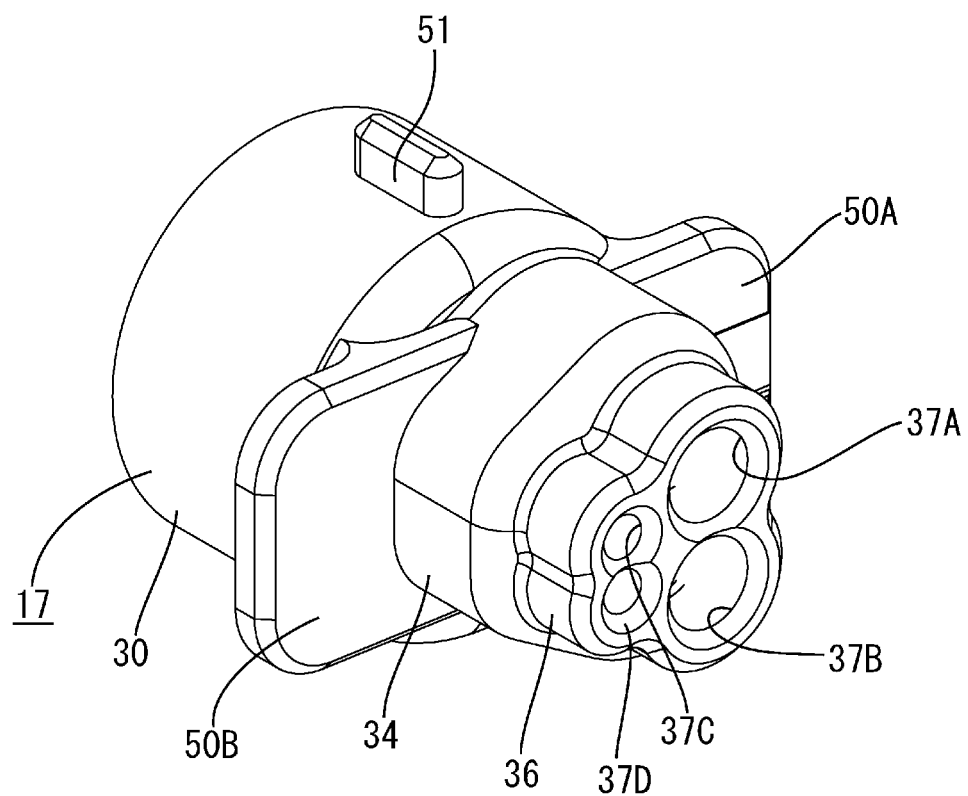
FIG. 12 is a perspective view showing a cap.

As shown in FIGS. 3 and 4, a narrow portion 34 that is fitted around the electrical wire through-hole portion 21 of the rubber plug 15 is provided at a position in the cap 17 that is forward (on the right side in FIG. 3) relative to the wide portion 30. The outer diameter dimension of the narrow portion 34 is set smaller than the outer diameter dimension of the wide portion 30. As shown in FIGS. 5 and 12, the cross-sectional shape of the narrow portion 34 is a rounded-corner trapezoid that conforms to the outer shape of the electrical wire through-hole portion 21.

As shown in FIGS. 3 and 4, the inner periphery of the narrow portion 34 comes into close contact with multiple (three in the present embodiment) narrow portion-side lips 35 formed on the outer periphery of the electrical wire through-hole portion 21. As shown in FIGS. 8 and 9, the narrow portion-side lips 35 are formed on the outer peripheral surface of the electrical wire through-hole portion 21 so as to protrude outward and extend along the circumferential direction of the electrical wire through-hole portion 21. When the narrow portion-side lips 35 come into close contact with the inner periphery of the narrow portion 34 of the cap 17, the narrow portion 34 of the cap 17 and the electrical wire through-hole portion 21 of the rubber plug 15 are sealed.

As shown in FIGS. 3 and 4, in the state where the narrow portion 34 of the cap 17 is fitted around the electrical wire through-hole portion 21 of the rubber plug 15, the narrow portion 34 presses the electrical wire through-hole portion 21 inward in the diameter direction of the electrical wire through-hole portion 21. Accordingly, the electrical wire through-hole portion 21 is compressed from the outside. Accordingly, the first to fourth electrical wire-side lips 26A, 26B, 26C, and 26D formed on the inner peripheries of the first to fourth through-holes 22A, 22B, 22C, and 22D are reliably brought into close contact with the outer peripheries of the first to fourth electrical wires 13A, 13B, 13C, and 13D respectively.

As shown in FIGS. 3 and 4, the cap 17 includes a deep-side wall 36 on the front side (right side in FIG. 3) of the narrow portion 34. As shown in FIGS. 5 and 12, a first lead-out hole 37A, a second lead-out hole 37B, a third lead-out hole 37C, and a fourth lead-out hole 37D are formed in the deep-side wall 36 in a manner of passing through the deep-side wall 36 such that the first electrical wire 13A, the second electrical wire 13B, the third electrical wire 13C, and the fourth electrical wire 13D respectively extend out from the cap 17.

As shown in FIG. 6, when the rubber plug locking portions 32 formed on the wide portion 30 of the cap 17 engage with the rubber plug locked portions 33 formed in the sheath covering portion 18 of the rubber plug 15, the rubber plug 15 is positioned relative to the cap 17. Accordingly, as shown in FIGS. 3 and 4, the first to fourth through-holes 22A, 22B, 22C, and 22D formed in the rubber plug 15 are aligned with the first to fourth lead-out holes 37A, 37B, 37C, 37D formed in the cap 17. More specifically, the first through-hole 22A and the first lead-out hole 37A are aligned each other, the second through-hole 22B and the second lead-out hole 37B are aligned each other, the third through-hole 22C and the third lead-out hole 37C are aligned each other, and the fourth through-hole 22D and the fourth lead-out hole 37D are aligned each other.

As shown in FIGS. 5 and 12, the cap 17 is provided with two locking protrusions 50A and 50B that protrude outward in the diameter direction of the narrow portion 34 from the outer surface of the narrow portion 34. Out of these two locking protrusions 50A and 50B, the one locking protrusion 50A protrudes from the long side 23 side of the narrow portion 34, and the other locking protrusion 50B protrudes from the short side 24 side of the narrow portion 34. The two locking protrusions 50A and 50B are plate-shaped, and have an approximately rectangular shape overall.

Also, a rotation prevention protrusion 51 that protrudes upward is formed on the outer periphery of the wide portion 30 of the cap 17. The rotation prevention protrusion 51 is shaped as a rib that extends in the extending direction of the wide portion 30 (left-right direction in FIG. 1).

Figure 14:
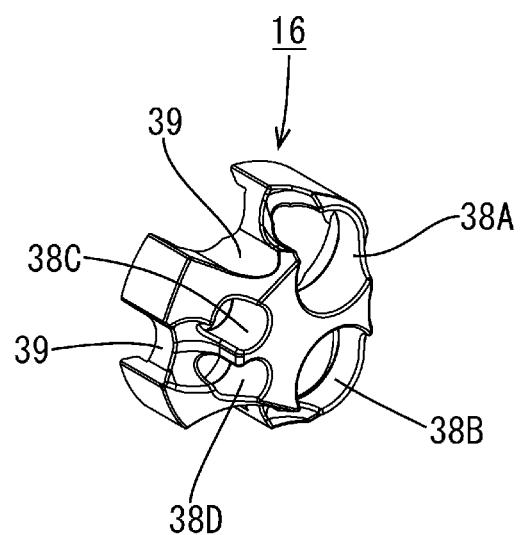
FIG. 14 is a perspective view showing a guide member.
Figure 15:
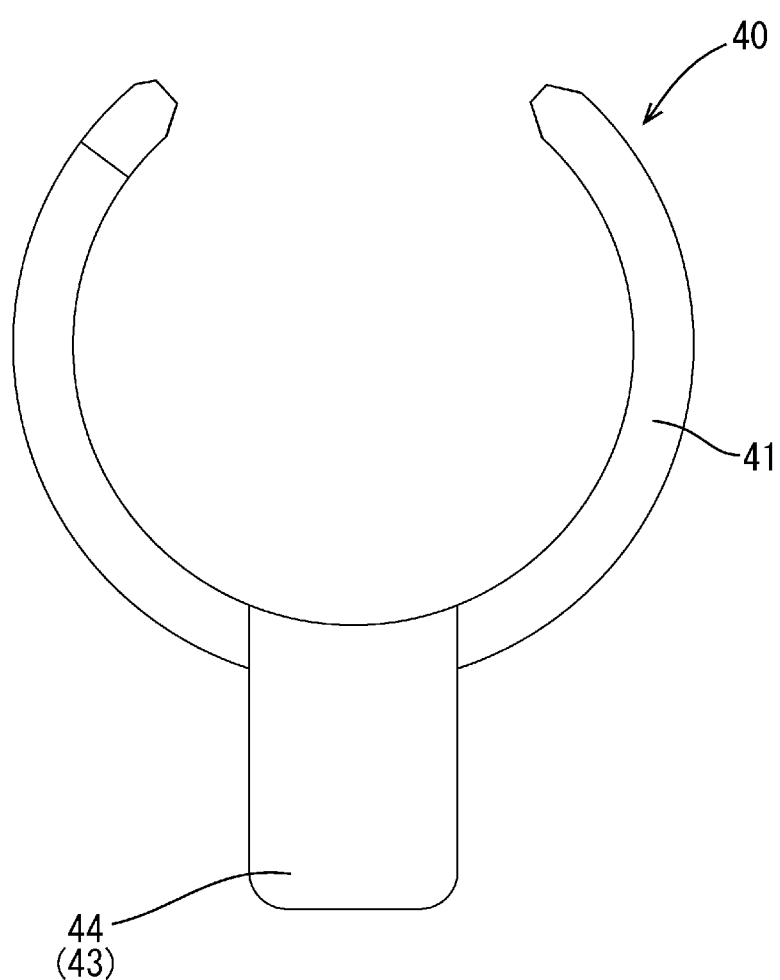
FIG. 15 is a front view showing a crimping member.

The guide member 16 is made of a synthetic resin, and as shown in FIGS. 6 and 14, is provided with a first guide hole 38A for passage of the first electrical wire 13A, a second guide hole 38B for passage of the second electrical wire 13B, a third guide hole 38C for passage of the third electrical wire 13C, and a fourth guide hole 38D for passage of the fourth electrical wire 13D.

As shown in FIGS. 6 and 11, multiple (four in the present embodiment) guide member locking portions 29 that protrude inward are formed on the inner periphery of the holding portion 28 of the rubber plug 15.

Multiple (four in the present embodiments) guide member locked portions 39, into which the four guide member locking portions 29 are fitted, are formed in the guide member 16 so as to recede from the outer periphery of the guide member 16. The four guide member locked portions 39 formed in the guide member 16 are formed at positions respectively corresponding with the four guide member locking portions 29 formed on the rubber plug 15.

The four guide member locking portions 29 formed on the holding portion 28 of the rubber plug 15 respectively engage with the four guide member locked portions 39 formed in the guide member 16. Accordingly, the guide member 16 is held in a state where rotation in the circumferential direction of the guide member 16 relative to the rubber plug 15 is suppressed. Accordingly, the rubber plug 15 and the guide member 16 are positioned relative to each other. As a result, as shown in FIGS. 3 and 4, the first to fourth through-holes 22A, 22B, 22C, and 22D of the rubber plug 15 are respectively aligned with the first to fourth guide holes 38A, 38B, 38C, and 38D of the guide member 16. More specifically, the first through-hole 22A and the first guide hole 38A are aligned each other, the second through-hole 22B and the second guide hole 38B are aligned each other, the third through-hole 22C and the third guide hole 38C are aligned each other, and the fourth through-hole 22D and the fourth guide hole 38D are aligned each other.

As shown in FIGS. 1 to 4, the crimping member 40 is attached to the sheath 14 at a position that is adjacent to the rubber plug 15 on the rear side of the rubber plug 15 toward the end portion 14A. The crimping member 40 is made of a metal, and has a main body portion 41 that is approximately shaped as a tube having a C-shaped cross-section (see FIG. 15). The two edges of the main body portion 41 in the circumferential direction are wave-shaped (see FIG. 1). The main body portion 41 has elasticity in an opening-closing direction.

Two elongated holes 42 that extend in the circumferential direction are formed in a circumferentially central portion of the main body portion 41, are side-by-side in the lengthwise direction of the main body portion 41, and pass through the plate surface of the same (see FIG. 2).

Also, as shown in FIGS. 2 and 24, a locking piece 43 that extends toward the front side (right side in FIG. 2) is provided in a circumferentially central portion of one end side (front side) in the lengthwise direction of the main body portion 41. This locking piece 43 extends along the main body portion 41, the leading end side bends outward to form an L shape, and this leading end is a mating portion 44 having a width dimension for exactly fitting into the later-described receiving recession portion 17B provided in the extending piece 17A of the cap 17.

After the seal member 10 is attached to the end portion of the sheath 14, the multicore cable 11 is placed in a holder 52.

Figure 19:
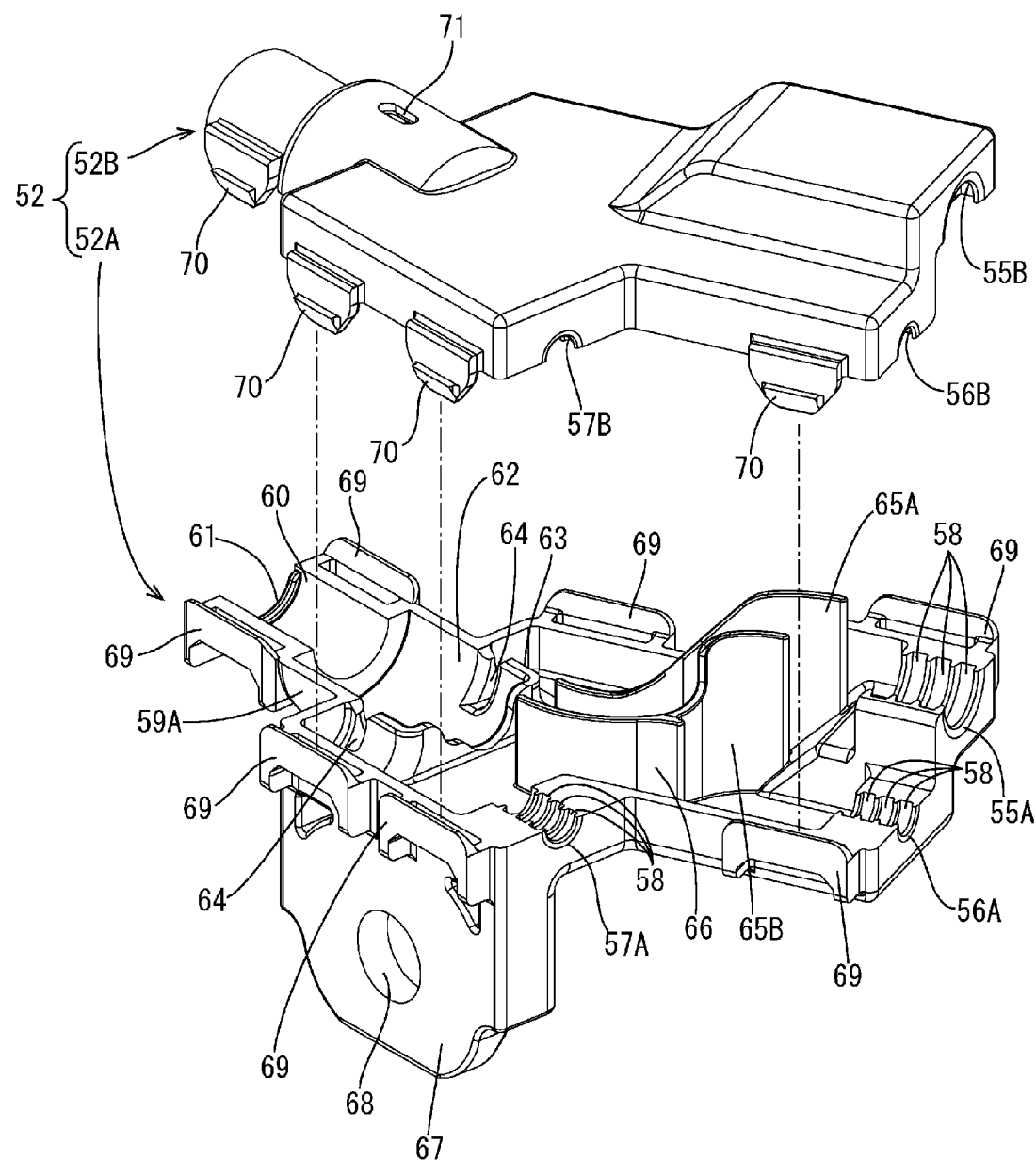
FIG. 19 is an exploded perspective view of a holder.

As shown in FIG. 19, the holder 52 includes a lower holder 52A and an upper holder 52B that is attached to the lower holder 52A.

Figure 20:
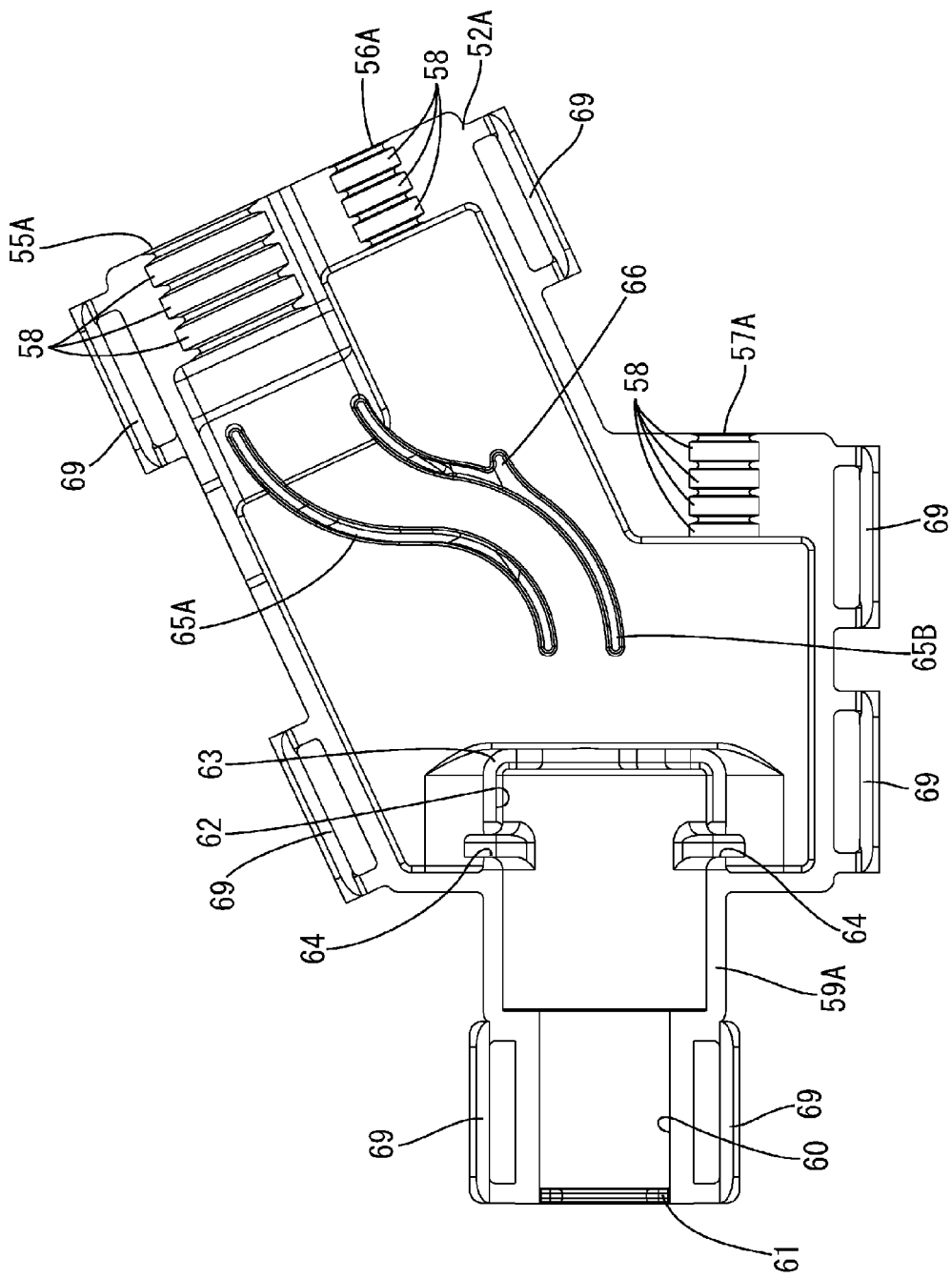
FIG. 20 is a plan view of a lower holder.

As shown in FIGS. 19 and 20, the lower holder 52A includes a bottom wall and side walls that rise upward from side edges of the bottom wall. One side wall is provided with a motor electrical wire lead-out hole 55A from which the first electrical wire 13A and the second electrical wire 13B extend, and a sensor electrical wire lead-out hole 56A from which the third electrical wire 13C and the fourth electrical wire 13D extend, and these two lead-out holes are recessed in a semicircular shape. Also, a side wall different from the side wall provided with the motor electrical wire lead-out hole 55A and the sensor electrical wire lead-out hole 56A is provided with a spare lead-out hole 57A that is recessed in a semicircular shape and is for an electrical wire (not shown) for connection to a device different from the motor and the sensor.

Multiple holding grooves 58 for holding a corrugated tube (not shown) are formed in the inner peripheral surfaces of the motor electrical wire lead-out hole 55A, the sensor electrical wire lead-out hole 56A, and the spare lead-out hole 57A.

An extending portion 59A that protrudes outward is formed on a side wall of the lower holder 52A that is different from the side walls provided with the motor electrical wire lead-out hole 55A, the sensor electrical wire lead-out hole 56A, and the spare lead-out hole 57A. The cross-sectional shape of the extending portion 59A is approximately semicircular.

The leading end side of the extending portion 59A is a crimping member holding portion 60 for holding the crimping member 40 in the state of being crimped around the sheath 14. The inner diameter dimension of the crimping member holding portion 60 is set to a dimension according to which the main body portion 41 of the crimping member 40 crimped around the sheath 14 is accommodated in the crimping member holding portion 60 with no play in the diameter direction (see FIGS. 21 and 22).

A holding rib 61 that protrudes inward and extends in the circumferential direction of the crimping member holding portion 60 is formed on the end edge portion on the leading end side of the crimping member holding portion 60. This holding rib 61 prevents the crimping member 40 from falling outward from the crimping member holding portion 60.

Also, the dimension of the crimping member holding portion 60 in the extending direction is set to a dimension according to which, in the state where the main body portion 41 of the crimping member 40 is crimped around the sheath 14, and the mating portion 44 is fitted into the receiving recession portion 17B of the cap 17, the crimping member 40 is accommodated in the crimping member holding portion 60 with no play in the extending direction.

A cap holding portion 62 for holding the cap 17 is formed so as to extend from the base end side of the extending portion 59A to a position somewhat inward of the extending portion 59A on the lower holder 52A.

The portion of the cap holding portion 62 on the base end side of the extending portion 59A accommodates the wide portion 30 of the cap 17. The dimension of this portion that accommodates the wide portion 30 is set to a dimension according to which the wide portion 30 is accommodated therein with no play in the diameter direction (see FIGS. 21 and 22).

Also, a partition wall 63 that protrudes upward from the bottom wall is formed on the cap holding portion 62 at a position inward in the lower holder 52A relative to the side wall, and the narrow portion 34 of the cap 17 is accommodated in the region surrounded by this partition wall 63. Locking grooves 64, into which the locking protrusions 50A and 50B of the cap 17 are inserted, are formed in the partition wall 63 at positions that correspond to the locking protrusions 50A and 50B when the cap 17 is accommodated inside the partition wall 63, and these locking grooves 64 extend downward from the upper edges of the partition wall 63.

In the state where the cap 17 is accommodated in the cap holding portion 62, the locking protrusions 50A and 50B are inserted into the locking grooves 64. Accordingly, due to the locking protrusions 50A and 50B abutting against the inward surfaces of the locking grooves 64 in the thickness direction of the locking protrusions 50A and 50B, shifting of the relative positions of the cap 17 and the holder 52 is suppressed (see FIG. 21).

The locking grooves 64 are formed in the partition wall 63 at positions somewhat inward of the side wall of the lower holder 52A. Accordingly, force applied to the cap 17 is received by the side wall of the lower holder 52A.

The width dimension of the locking grooves 64 is set the same as or somewhat larger than the thickness dimension of the locking protrusions 50A and 50B. Inclined surfaces for guiding the locking protrusions 50A and 50B are formed in the opening edge portions of the locking grooves 64 so as to become wider in the upward direction.

Figure 21:
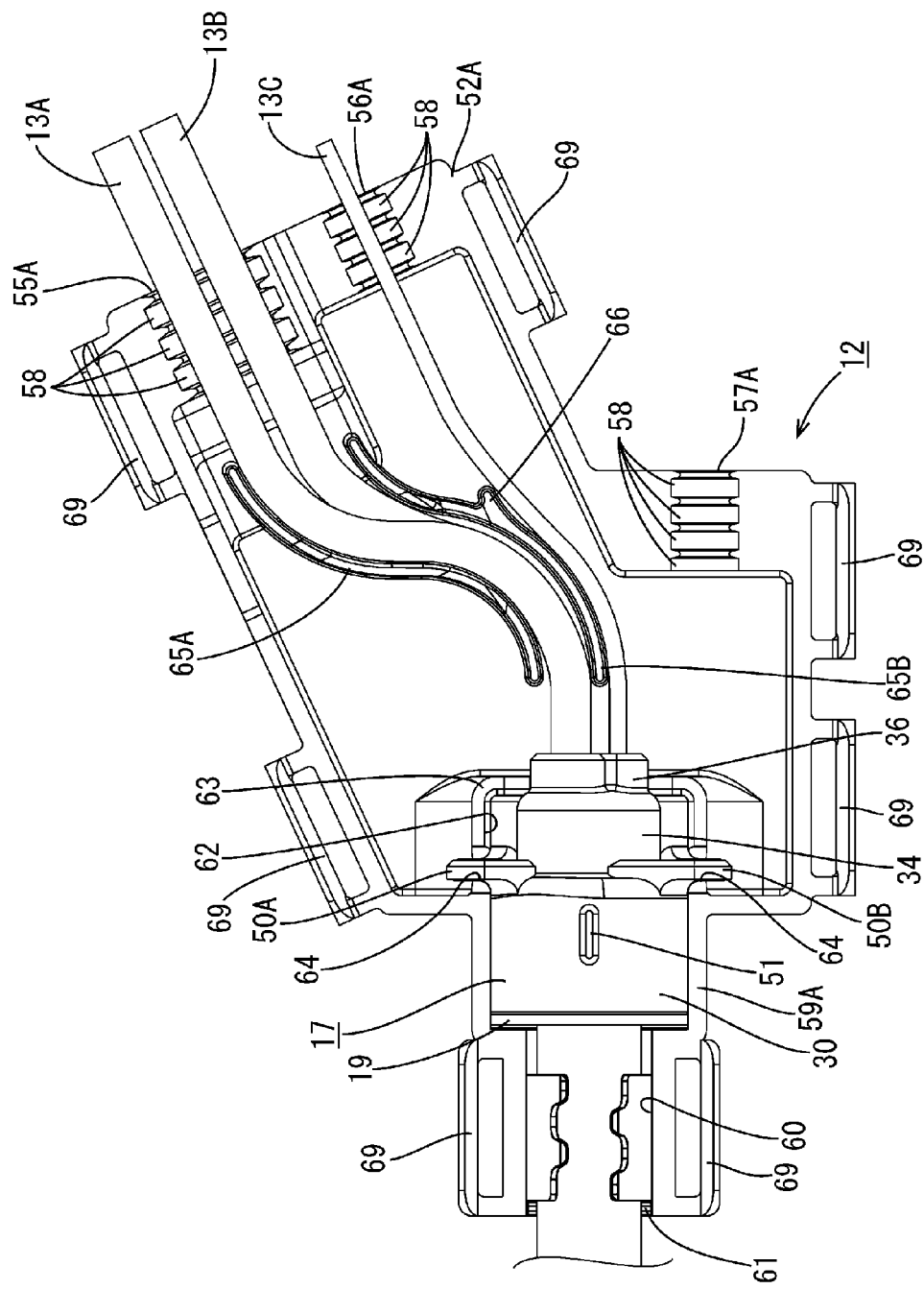
FIG. 21 is a plan view of the lower holder in a state in which a multicore cable with the seal member attached thereto is arranged in the lower holder.

As shown in FIGS. 19 to 21, the bottom wall of the lower holder 52A is provided with a first electrical wire routing portion 65A and a second electrical wire routing portion 65B for guiding the first to fourth electrical wires 13A, 13B, 13C, and 13D, which extend out from the first to fourth through-holes 22A, 22B, 22C, and 22D of the rubber plug 15, along a predetermined routing path. The first electrical wire routing portion 65A and the second electrical wire routing portion 65B are formed in the shape of a wall that rises upward from the bottom wall. The second electrical wire routing portion 65B is provided on the side nearer to the sensor electrical wire lead-out hole 56A.

The first electrical wire routing portion 65A and the second electrical wire routing portion 65B are formed so as to gently curve from a position in the vicinity of the cap holding portion 62 to a position in the vicinity of the motor electrical wire lead-out hole 55A. The first electrical wire routing portion 65A and the second electrical wire routing portion 65B are approximately S-shaped in a view from above. The first electrical wire 13A and the second electrical wire 13B are accommodated between the first electrical wire routing portion 65A and the second electrical wire routing portion 65B. Accordingly, the first electrical wire 13A and the second electrical wire 13B are routed in a routing path that extends from the cap 17 to the motor electrical wire lead-out hole 55A.

A guide protrusion 66 that extends toward the sensor electrical wire lead-out hole 56A is formed on the second electrical wire routing portion 65B at a position in the vicinity of the sensor electrical wire lead-out hole 56A. The third electrical wire 13C and the fourth electrical wire 13D that extend out from the cap 17 are guided by abutting against the second electrical wire routing portion 65B and abutting against the guide protrusion 66, thus being routed in a routing path that extends from the cap 17 to the sensor electrical wire lead-out hole 56A.

A bracket 67 that protrudes downward is formed on a side wall of the lower holder 52A (see FIG. 19). A bolt insertion hole 68 passes through the bracket 67. By inserting a bolt (not shown) through the bolt insertion hole 68 and screwing it to a vehicle, the holder 52 is fixed to vehicle.

Figure 22:
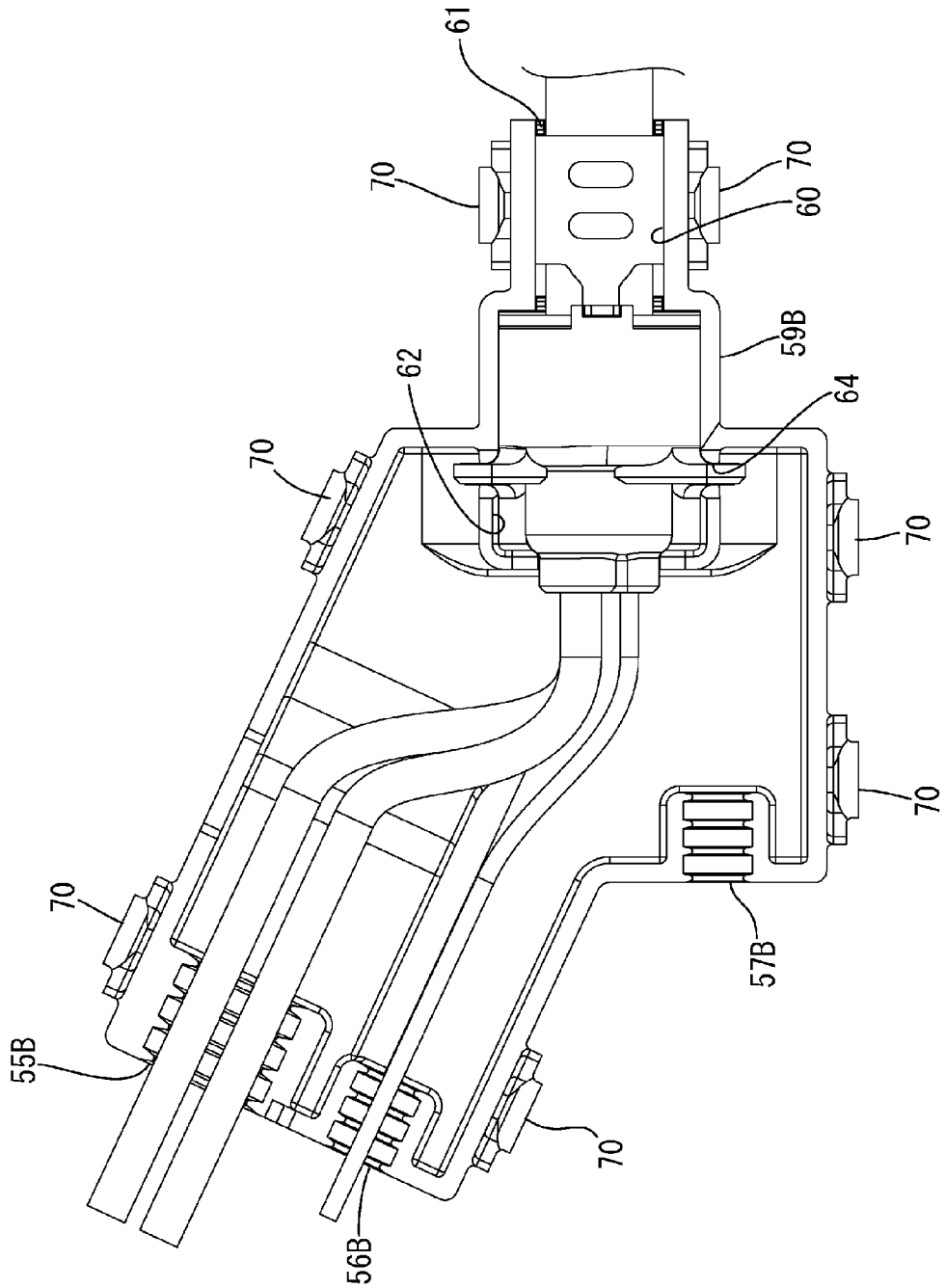
FIG. 22 is a bottom view of an upper holder in a state in which the multicore cable with the seal member attached thereto is arranged in the upper holder.
Figure 23:
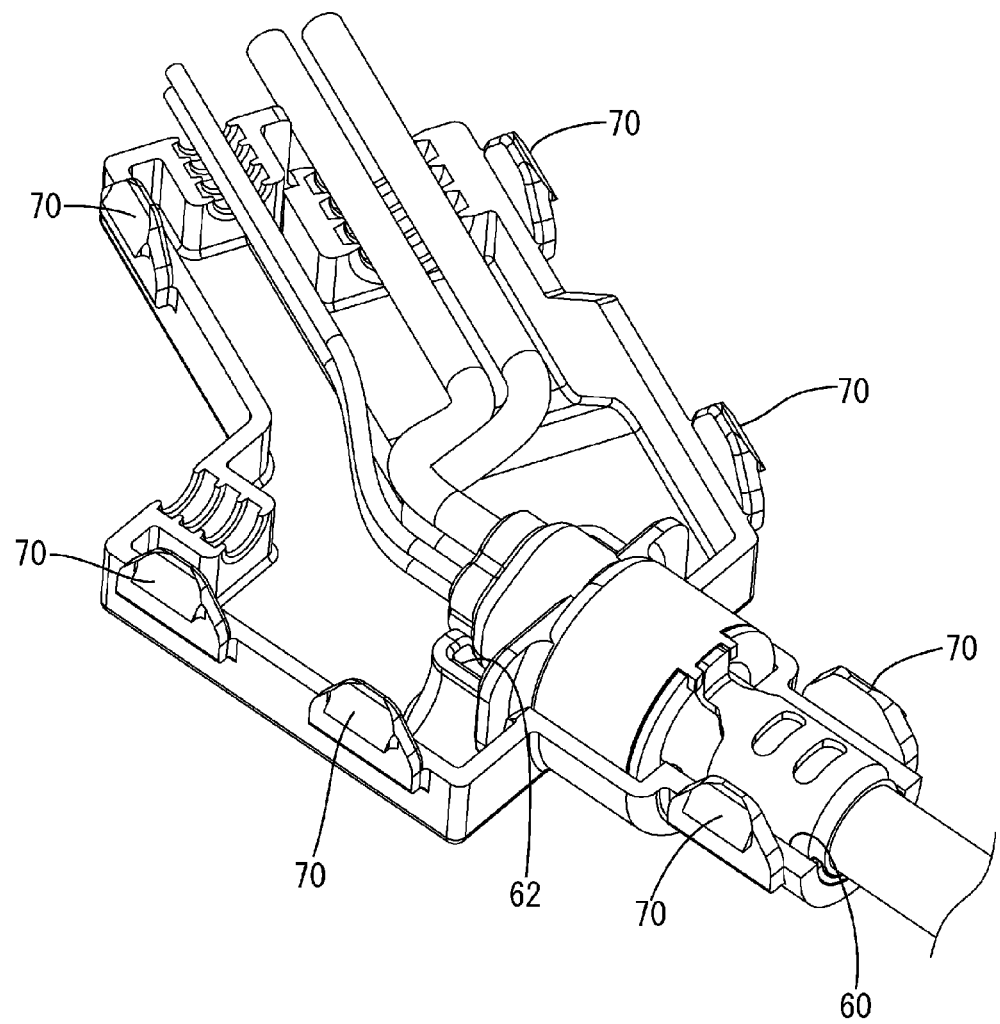
FIG. 23 is a perspective view of the upper holder in a state in which the multicore cable with the seal member attached thereto is arranged in the upper holder.

As shown in FIGS. 19, 22, and 23, the upper holder 52B includes an upper wall and side walls that extend downward from edges of the upper wall. Multiple lock receiving portions 70 are formed on side walls of the upper holder 52B at positions corresponding to multiple lock portions 69 formed on side walls of the lower holder 52A. When the lock portions 69 and the lock receiving portions 70 elastically engage with each other, the lower holder 52A and the upper holder 52B are assembled together (see FIG. 25).

A motor electrical wire lead-out hole 55B, a sensor electrical wire lead-out hole 56B, a spare lead-out hole 57B, and an extending portion 59B are formed in side walls of the upper holder 52B at positions that correspond to the motor electrical wire lead-out hole 55A, the sensor electrical wire lead-out hole 56A, the spare lead-out hole 57A, and the extending portion 59A of the lower holder 52A in the state where the lower holder 52A and the upper holder 52B are assembled together.

Figure 25:
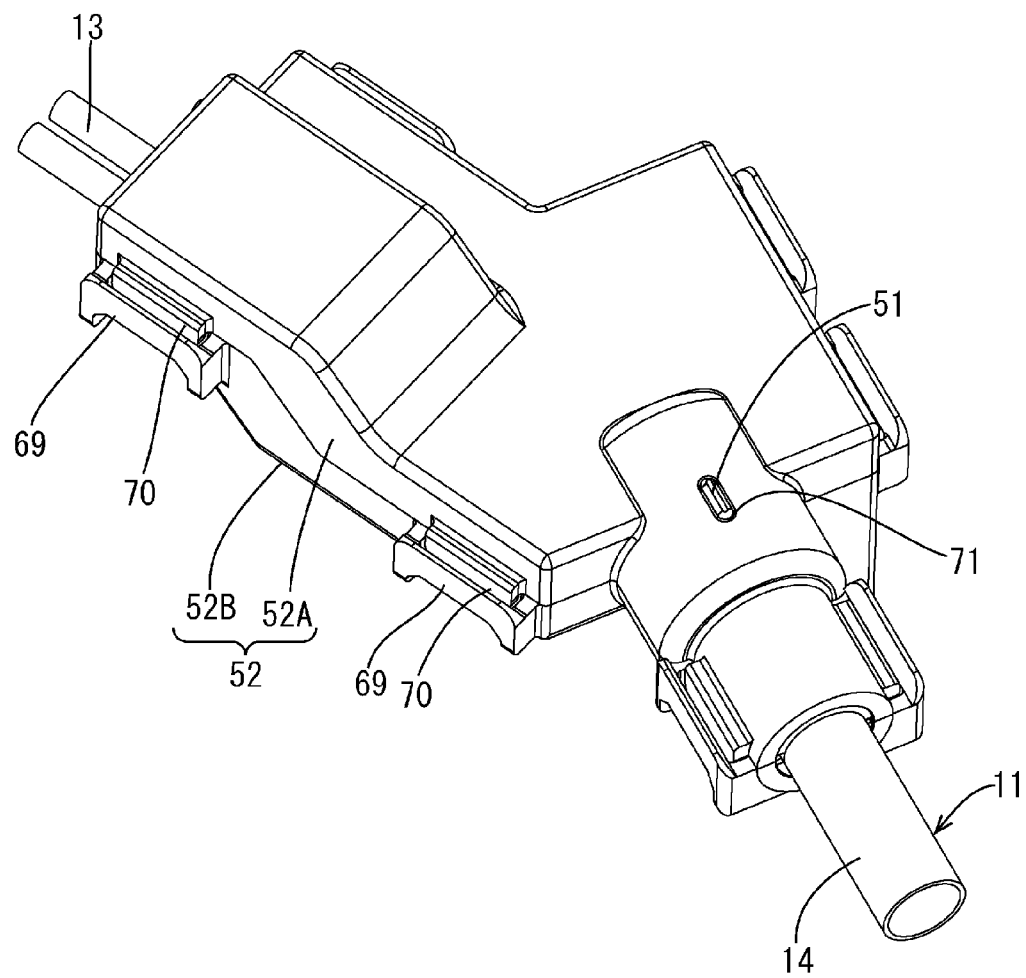
FIG. 25 is a perspective view of a state in which the multicore cable has been attached to the holder.
Figure 26:
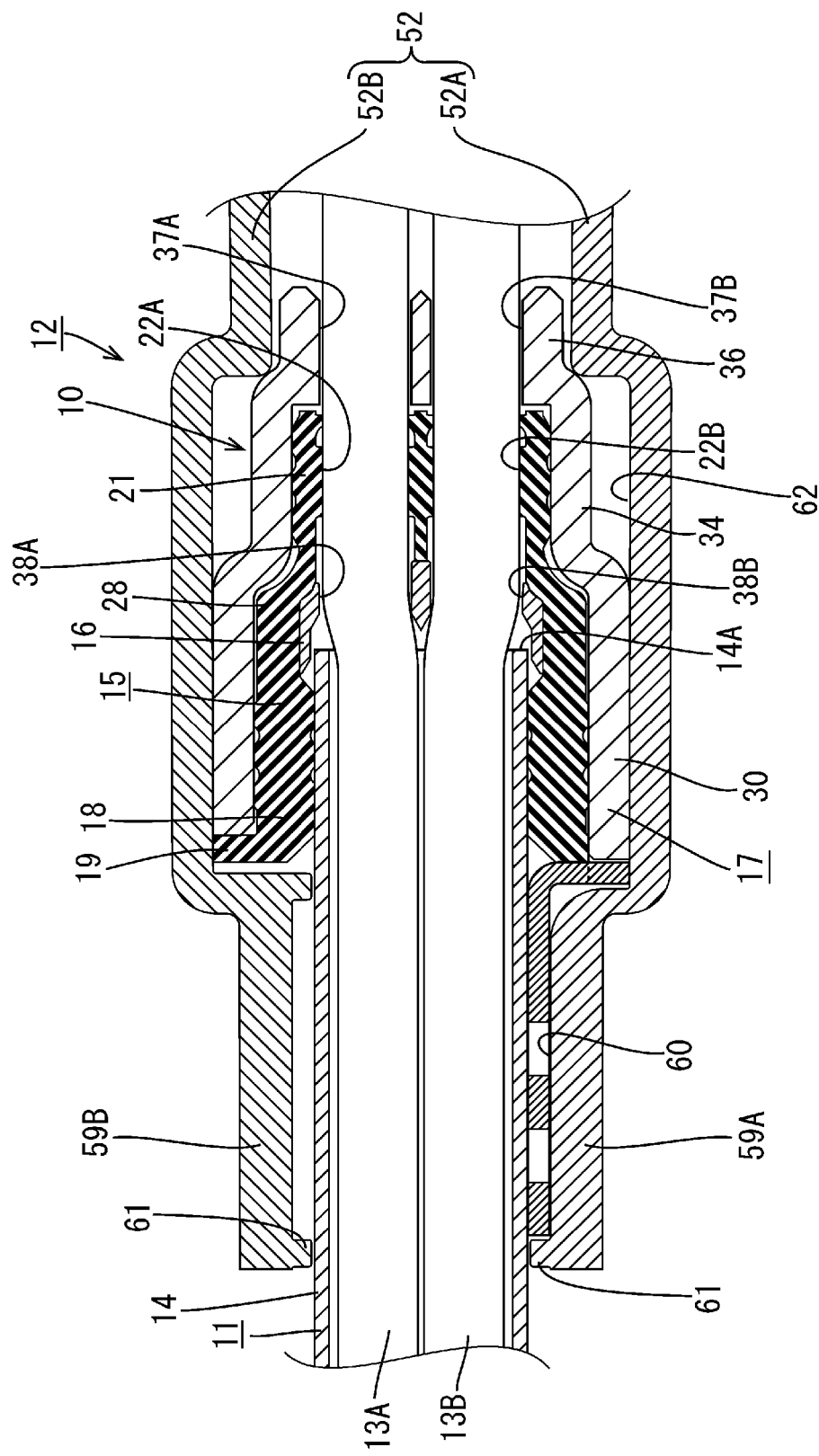
FIG. 26 is a cross-sectional view of the state in which the multicore cable has been attached to the holder.

A rotation prevention hole 71 is formed to pass through the extending portion 59B of the upper holder 52B at a position that corresponds to the rotation prevention protrusion 51 of the cap 17 in the state where the cap 17 is accommodated in the cap holding portion 62 (see FIGS. 19 and 25). When the rotation prevention protrusion 51 is inserted into the rotation prevention hole 71, and the rotation prevention protrusion 51 abuts against the inner peripheral surface of the rotation prevention hole 71, rotation of the cap 17 in the circumferential direction of the wide portion 30 of the cap 17 inside the cap holding portion 62 is suppressed.

Also, due to the rotation prevention hole 71 being provided in the upper holder 52B, the cap 17 (seal member 10) can be reliably positioned in the up-down direction relative to the holder 52. Accordingly, the first to fourth electrical wires 13A, 13B, 13C, and 13D that extend out from the cap 17 can be easily aligned with the first electrical wire routing portion 65A and the second electrical wire routing portion 65B.

Note that the upper holder 52B is provided with a crimping member holding portion 60, a cap holding portion 62, and a locking groove 64 that are at positions corresponding to and have configurations similar to the crimping member holding portion 60, the cap holding portion 62, and the locking groove 64 of the lower holder 52A.

Manufacturing Steps

Next, an example of manufacturing steps of the present embodiment will be described. Note that the manufacturing steps of the present embodiment are not limited to the description given below.

First, the sheath 14 of the multicore cable 11 is stripped using a known technique. Accordingly, the first to fourth electrical wires 13A, 13B, 13C, and 13D extend from the end portion 14A of the sheath 14.

Figure 16:
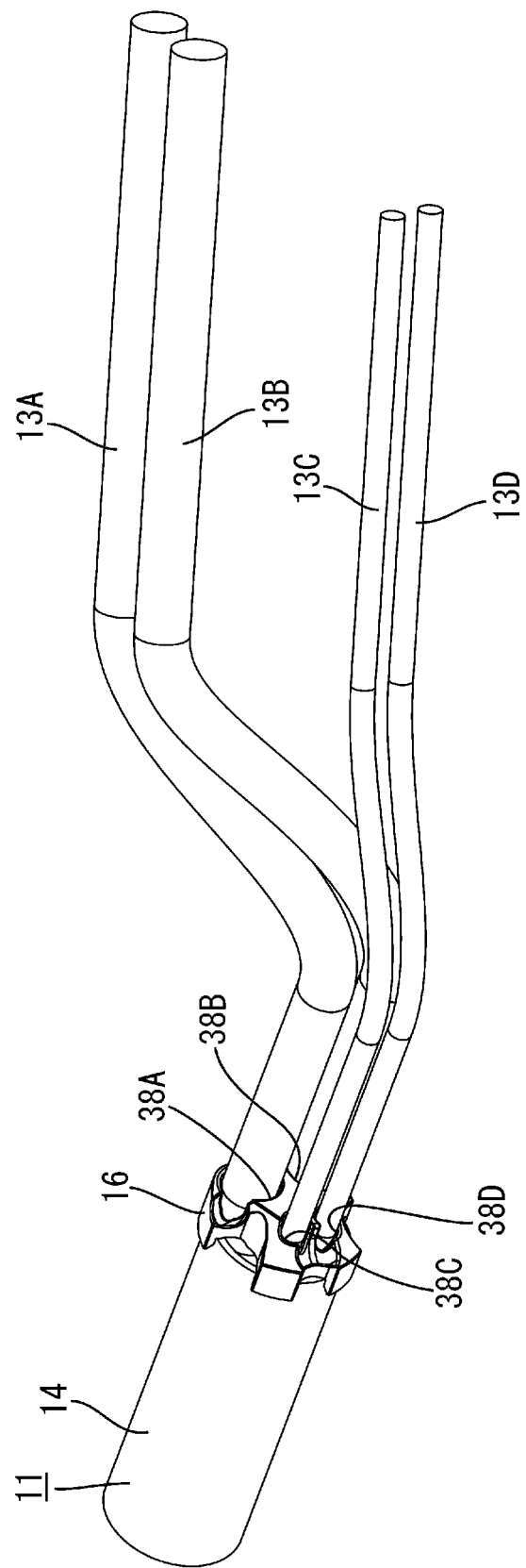
FIG. 16 is a perspective view showing a state in which the guide member is attached to multiple electrical wires in a multicore cable whose sheath has been stripped.

Next, as shown in FIG. 16, the first to fourth electrical wires 13A, 13B, 13C, and 13D are respectively inserted into the first to fourth guide holes 38A, 38B, 38C, and 38D of the guide member 16. Specifically, the first electrical wire 13A is inserted into the first guide hole 38A, the second electrical wire 13B is inserted into the second guide hole 38B, the third electrical wire 13C is inserted into the third guide hole 38C, and the fourth electrical wire 13D is inserted into the fourth guide hole 38D.

Next, the first to fourth electrical wires 13A, 13B, 13C, and 13D are respectively inserted into the first to fourth through-holes 22A, 22B, 22C, and 22D of the rubber plug 15. Specifically, the first electrical wire 13A is inserted into the first through-hole 22A, the second electrical wire 13B is inserted into the second through-hole 22B, the third electrical wire 13C is inserted into the third through-hole 22C, and the fourth electrical wire 13D is inserted into the fourth through-hole 22D. Thereafter, the rubber plug 15 is moved to the position of the guide member 16.

Figure 17:
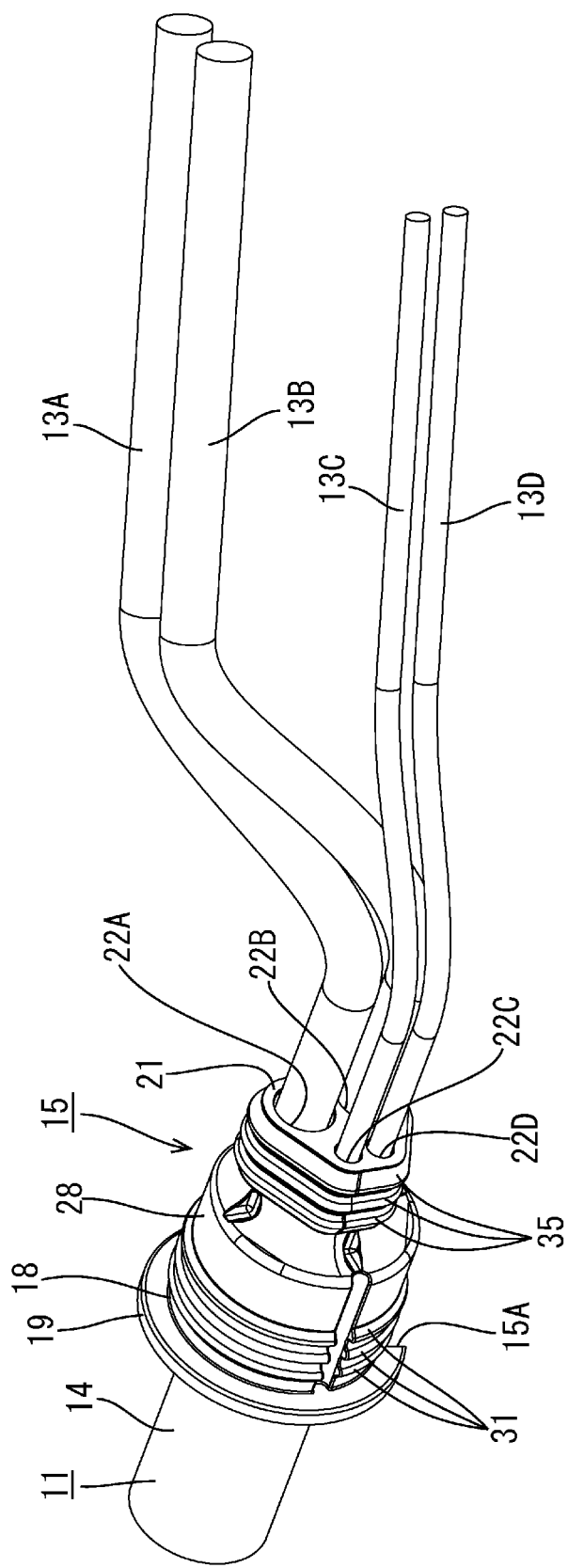
FIG. 17 is a perspective view showing a state in which the rubber plug has been fitted around the end portion of the sheath of the multicore cable.
Figure 18:
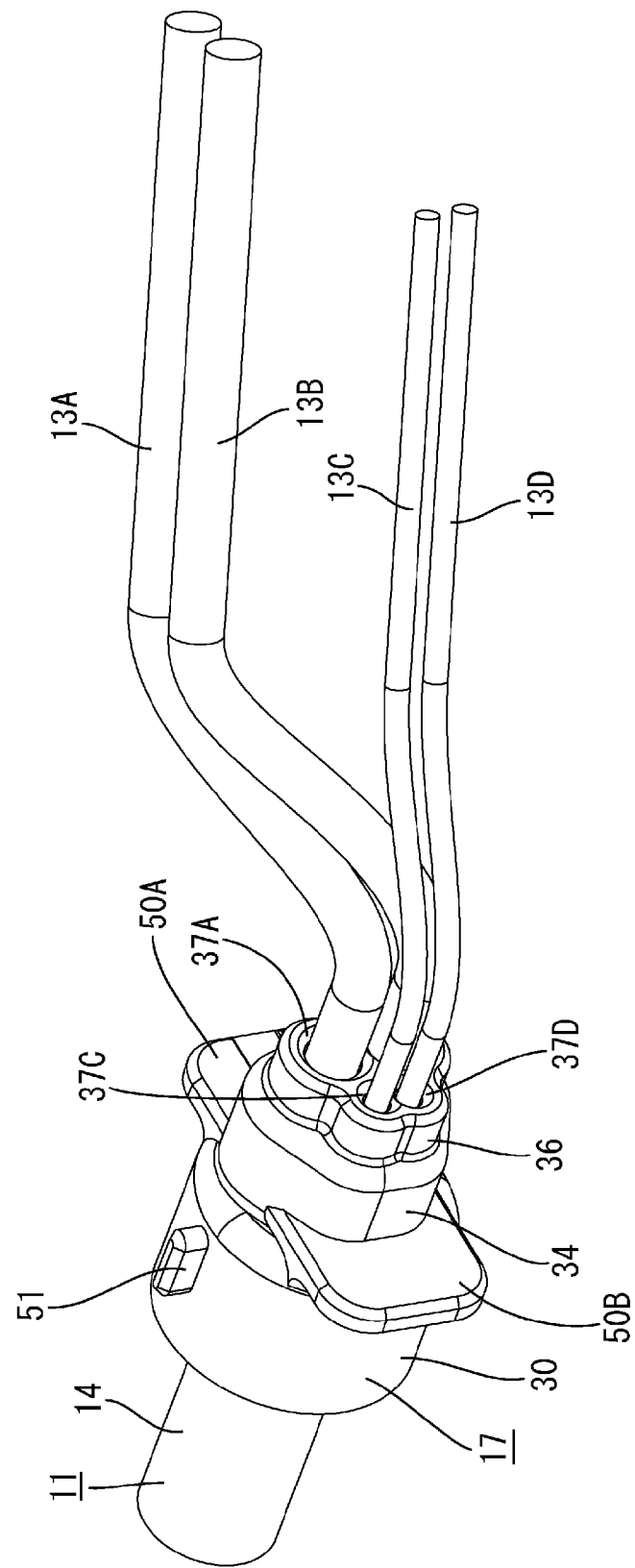
FIG. 18 is a perspective view showing a state in which the cap has been fitted around the rubber plug that is fitted around the multicore cable.

Next, the relative positions of the rubber plug 15 and the guide member 16 are adjusted so as to respectively align the first to fourth through-holes 22A, 22B, 22C, and 22D of the rubber plug 15 with the first to fourth guide holes 38A, 38B, 38C, and 38D of the guide member 16. In this state, the guide member 16 locking portions of the rubber plug 15 are locked to the guide member 16 locked portions of the guide member 16. Accordingly, the guide member 16 is held in the holding portion 28 of the rubber plug 15 in the state where the first to fourth through-holes 22A, 22B, 22C, and 22D of the rubber plug 15 are respectively aligned with the first to fourth guide holes 38A, 38B, 38C, and 38D of the guide member 16. Thereafter, as shown in FIG. 17, the rubber plug 15 is moved to the end portion 14A of the sheath 14, and the sheath covering portion 18 of the rubber plug 15 is fitted around the end portion 14A of the sheath 14.

Next, the first to fourth electrical wires 13A, 13B, 13C, and 13D are respectively inserted into the first to fourth lead-out holes 37A, 37B, 37C, 37D of the cap 17. Specifically, the first electrical wire 13A is inserted into the first lead-out hole 37A, the second electrical wire 13B is inserted into the second lead-out hole 37B, the third electrical wire 13C is inserted into the third lead-out hole 37C, and the fourth electrical wire 13D is inserted into the fourth lead-out hole 37D. Thereafter, the cap 17 is moved to the position of the rubber plug 15 fitted around the end portion 14A of the sheath 14.

Next, the relative positions of the rubber plug 15 and the cap 17 are adjusted so as to respectively align the first to fourth through-holes 22A, 22B, 22C, and 22D of the rubber plug 15 with the first to fourth lead-out holes 37A, 37B, 37C, 37D of the cap 17. In this state, the rubber plug 15 locking portions of the cap 17 are locked to the rubber plug 15 locked portions of the rubber plug 15. Accordingly, the cap 17 is fitted around the rubber plug 15 in the state where the first to fourth through-holes 22A, 22B, 22C, and 22D of the rubber plug 15 are respectively aligned with the first to fourth lead-out holes 37A, 37B, 37C, 37D of the cap 17. Thereafter, the cap 17 is pressed to a position of abutting against the flange portion 19 of the rubber plug 15 (see FIG. 18).

At this time, the extending piece 17A of the cap 17 passes through the notch portion 19A provided in the flange portion 19 of the rubber plug 15, and the leading end portion protrudes rearward of the back surface of the flange portion 19 (see FIG. 24).

Next, the main body portion 41 is attached to the sheath 14 while aligning the mating portion 44 of the crimping member 40 so as to be fitted into the receiving recession portion 17B of the cap 17. The main body portion 41 is attached to the sheath 14 while undergoing elastic deformation, and is then crimps the sheath 14 inward while attached thereto. Accordingly, the crimping member 40 is fixed relative to the sheath 14, and the electrical wires 13 in the sheath 14 are held so as to not move.

In this way, the seal member 10 according to the present embodiment is completed, and the seal structure 12 of the multicore cable 11 is completed (see FIGS. 1 to 4).

Next, as shown in FIG. 21, the crimping member 40 crimped around the sheath 14 is placed in the crimping member holding portion 60 of the lower holder 52A, and the cap 17 is placed in the cap holding portion 62 such that the rotation prevention protrusion 51 of the cap 17 is oriented upward. At this time, the locking protrusions 50A and 50B of the cap 17 are inserted into the locking grooves 64 from above.

Next, the first electrical wire 13A and the second electrical wire 13B that extend out from the cap 17 are arranged between the first electrical wire routing portion 65A and the second electrical wire routing portion 65B, and are routed to the motor electrical wire lead-out hole 55A. Also, the third electrical wire 13C and the fourth electrical wire 13D that extend out from the cap 17 are arranged along the second electrical wire routing portion 65B and the guide protrusion 66, and are routed to the sensor electrical wire lead-out hole 56A.

Next, the upper holder 52B is attached to the lower holder 52A from above. At this time, the lock portions 69 and the lock receiving portions 70 elastically engage with each other, thus assembling the upper holder 52B and the lower holder 52A into an integrated body (see FIG. 25). Also, in this state, the rotation prevention protrusion 51 of the cap 17 is fitted into the rotation prevention hole 71 of the upper holder 52B.

Next, actions and effects of the present embodiment will be described.

According to the seal structure 12 of the multicore cable 11 and the seal member 10 of the present embodiment, the cap 17 is fitted around the rubber plug 15 and presses it inward, the rubber plug locking portions 32 are locked to the rubber plug locked portions 33, and the extending piece 17A is inserted into the notch portion 19A to prevent rotation, thus holding the relative positions of the cap 17 and the rubber plug 15.

Also, the crimping member 40 crimps the sheath 14, thus holding the relative positions of the crimping member 40 and the sheath 14. Moreover, in the portion of the sheath 14 that is crimped by the crimping member 40 (main body portion 41), the electrical wires 13 are held by the crimping member 40 so as to not move inside the sheath 14.

Also, the relative positions of the cap 17 and the crimping member 40 are held due to the mating portion 44 of the locking piece 43 being fitted into the receiving recession portion 17B, therefore indirectly holding the relative positions of the rubber plug 15 and the sheath 14, and thus the rubber plug 15 and the electrical wires 13. Accordingly, even if strong twisting force or the like acts on the sheath 14 from the outside, the seal between the electrical wires 13 and the rubber plug 15 can be kept in a favorable state.

Also, the locking structure for locking the crimping member 40 and the cap 17 has a simple configuration in which the mating portion 44 of the locking piece 43 extending from the main body portion 41 of the crimping member 40 is merely fitted into the receiving recession portion 17B provided in the cap 17, thus eliminating the need for a complex locking structure, and achieving simple alignment and superior operability. Also, according to this configuration, rotation of the crimping member 40 and the cap 17 is reliably prevented, and twisting of the electrical wires 13 relative to the rubber plug 15 is suppressed.

In this way, according to the present embodiment, it is possible to improve the seal between the rubber plug 15 and the electrical wires 13 that extend out from the multicore cable 11.

OTHER EMBODIMENTS

The technology disclosed in the present specification is not intended to be limited to the embodiment described using the above descriptions and drawings, and embodiments such as the following examples are also encompassed in the technical scope of the technology disclosed in the present specification.

The above embodiment illustrates an aspect in which rotation of the cap 17 and the crimping member 40 is prevented by fitting the mating portion 44 of the locking piece 43 of the crimping member 40 into the receiving recession portion 17B provided in the cap 17, but a configuration is possible in which the mating portion is provided on the cap side, and the receiving recession portion for receiving the mating portion is provided on the crimping member side.

Also, a configuration is possible in which, for example, a lock hole is provided in one out of the cap and the crimping member, a locking portion capable of locking to the lock hole is provided on the other one, and the relative positions in the extending direction of the sheath are also held by locking of the lock hole and the locking portion.

Figure 27:
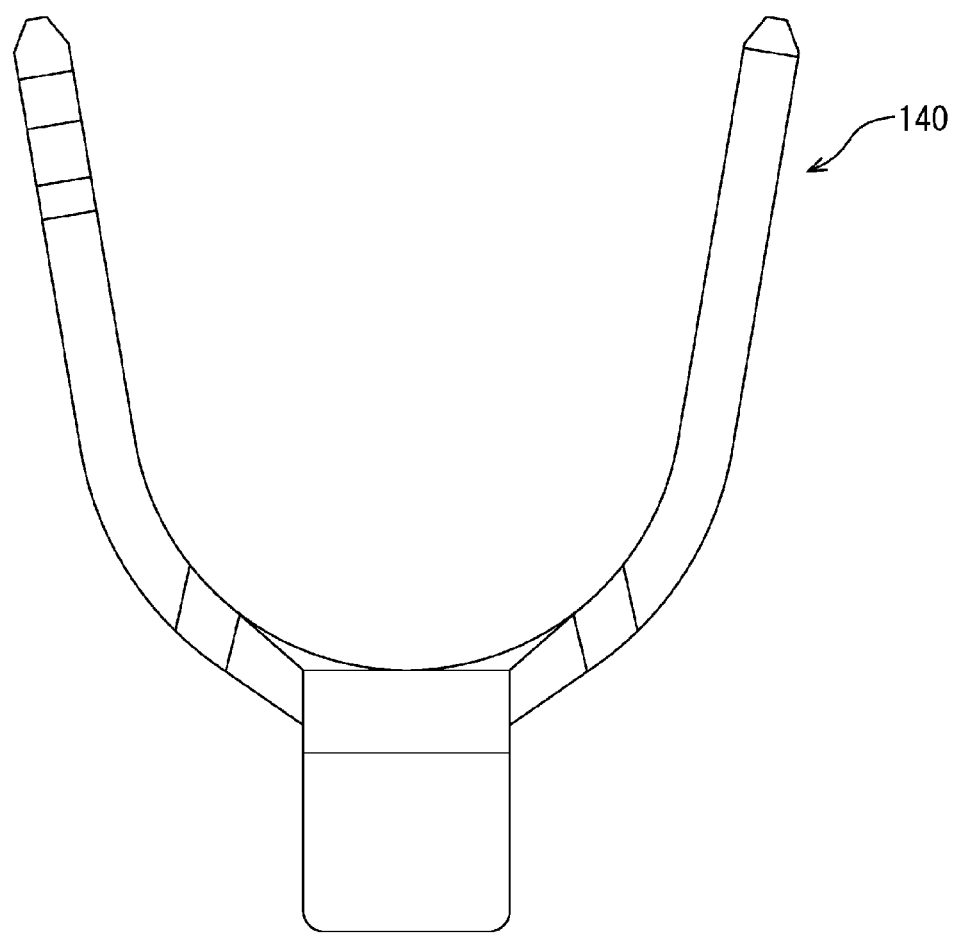
FIG. 27 is a front view of a crimping member of another embodiment.

In the above embodiment, the main body portion 41 of the crimping member 40 is shaped as a tube having a C-shaped cross-section so as to have elasticity, but an aspect is possible in which, as shown in FIG. 27 for example, the main body portion crimps the sheath by being pressed so as to wrap around the outer periphery of the sheath 14.

Although the crimping member 40 is made of a metal in the above embodiment, it may be made of a resin, for example.

In the configuration described in the above embodiment, rotation of the cap 17 and the rubber plug 15 is prevented by providing the rubber plug locking portions 32 and the rubber plug locked portions 33, but these members may be omitted.

The number of electrical wires arranged in the multicore cable 11 may be two to three, or five or more.

Although the electrical wires are configured to include two types of electrical wires having different outer diameter dimensions, the present invention is not limited to this, and a configuration is possible in which the electrical wires include three or more types of electrical wires having different outer diameter dimensions. Alternatively, the electrical wires may all have the same outer diameter dimension.

The guide member 16 can be omitted.

The electrical wires may be shielded electrical wires. Also, the electrical wires may be stranded wires that include a core wire obtained by twisting multiple metal strands, or may be so-called single-core wires in which the core wire is a metal rod member. In this way, any electrical wires can be appropriately selected as necessary.

The multicore cable 11 may be a so-called cab tire cable, or may be a multicore shielded wire in which multiple electrical wires are enveloped by a shielding layer. In this way, any multicore cable 11 can be appropriately selected as necessary.

According to the seal member 10 or the seal structure 12 of the present embodiment, any liquid such as water, oil, or an organic solvent can be sealed out as necessary.

The present embodiment illustrates a configuration in which the assembly of the seal member 10 and the formation of the seal structure 12 of the multicore cable 11 are achieved by attaching the guide member 16, the rubber plug 15, the cap 17, and the crimping member 40 in this order to the multicore cable 11 after stripping the sheath 14, but the present invention is not limited to this, and a configuration is possible in which the seal member 10 is assembled in advance, and the multicore cable 11 and the seal member 10 are assembled together by stripping the sheath 14 and then inserting the electrical wires of the multicore cable 11 into the seal member 10.

Figure 28:
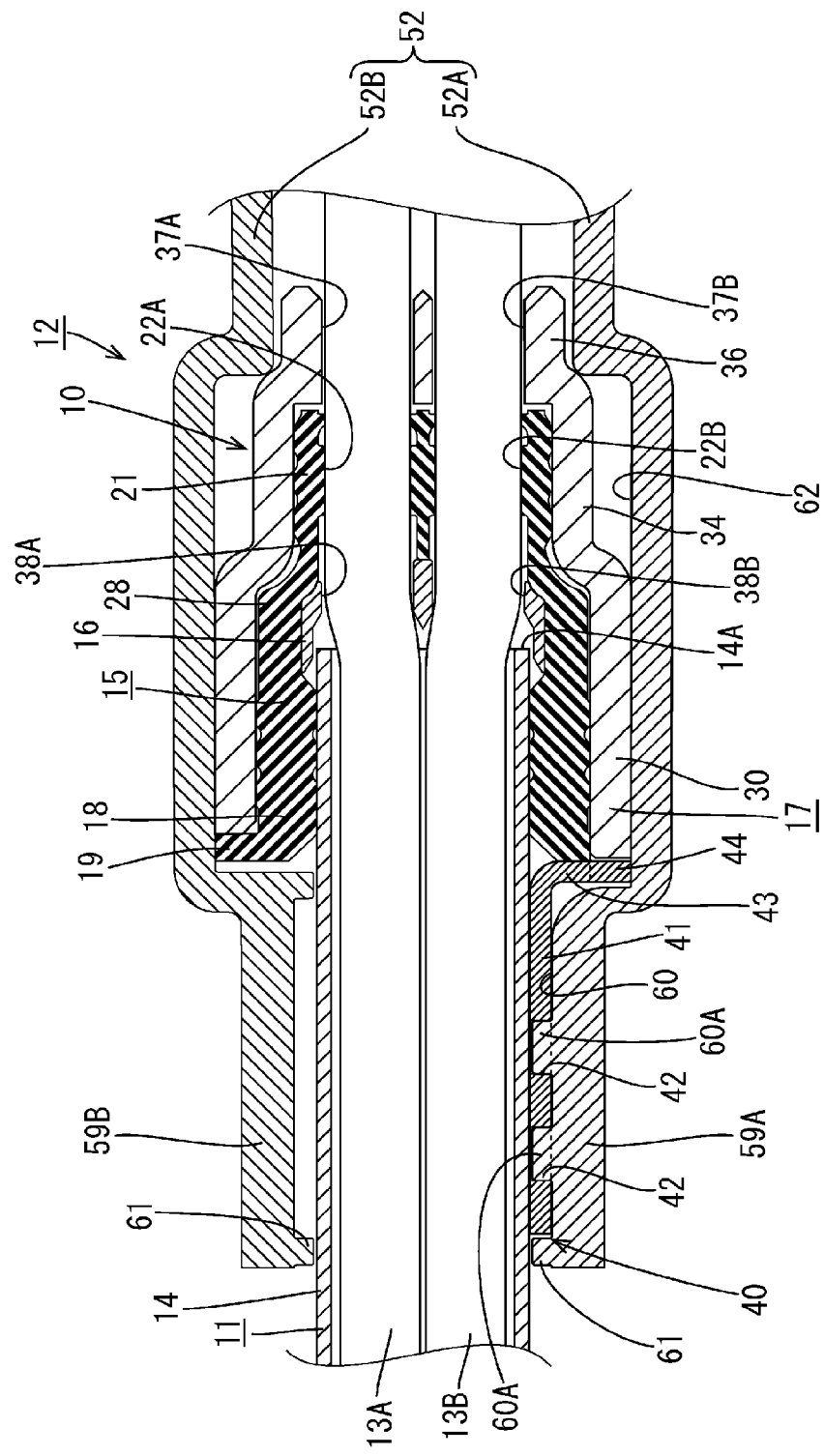
FIG. 28 is a cross-sectional view of a state in which a multicore cable has been attached to a holder in another embodiment.

A configuration is possible in which protrusion portions 60A that fit into the elongated holes 42 are provided in the crimping member holding portion 60 of the lower holder 52A at positions that correspond to the elongated holes 42 when the crimping member 40 is accommodated therein, and the crimping member 40 is stably held in the crimping member holding portion 60 by protrusion/recession engagement of the elongated holes 42 and the protrusion portions 60A (see FIG. 28).

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

REFERENCE SIGNS LIST

10: seal member
11: multicore cable
12: seal structure
13: electrical wire
14: sheath
15: rubber plug
16: guide member
17: cap
17A: extending piece (locked portion)
17B: receiving recession portion (locked portion)
18: sheath covering portion
19: flange portion
19A: notch
21: electrical wire through-hole portion
28: holding portion
30: wide portion
34: narrow portion
40: crimping member
41: main body portion
43: locking piece (locking portion)
44: mating portion (locking portion)

The invention claimed is:
1. A seal structure for a multicore cable, comprising:
a multicore cable in which a plurality of electrical wires are enveloped by a sheath, the plurality of electrical wires extending out from an end portion of the sheath;

a rubber plug through which the plurality of electrical wires pass, the rubber plug being fitted around the end portion of the sheath;

a cap that is fitted around the rubber plug and presses the rubber plug inward; and a crimping member that is arranged adjacent to the rubber plug and is crimped around the sheath, wherein the crimping member has a locking portion, and the cap has a locked portion, and relative positions of the crimping member and the rubber plug are held by the locking portion and the locked portion locking together.

2. The seal structure for a multicore cable according to claim 1, wherein the crimping member includes a main body portion that crimps the sheath, and the locking portion is a locking piece that extends from the main body portion toward the cap, the locked portion is a receiving recession portion into which the locking piece is fitted, and rotation of the crimping member and the cap is prevented by the locking piece and the receiving recession portion locking together.

3. The seal structure for a multicore cable according to claim 1, wherein the crimping member includes a main body portion that crimps the sheath and is shaped as a tube having a C-shaped cross-section that conforms to an outer periphery of the sheath.

4. The seal structure for a multicore cable according to claim 1, wherein the crimping member includes a main body portion that crimps the sheath by being pressed so as to wrap around an outer periphery of the sheath.

5. A seal member for attachment to a multicore cable in which a plurality of electrical wires are enveloped by a sheath, the plurality of electrical wires extending out from an end portion of the sheath, the seal member comprising:

a rubber plug through which the plurality of electrical wires pass, the rubber plug being fitted around the end portion of the sheath;

a cap that is fitted around the rubber plug and presses the rubber plug inward; and a crimping member that is arranged adjacent to the rubber plug and is crimped around the sheath, wherein the crimping member has a locking portion, and the cap has a locked portion, and relative positions of the crimping member and the cap are held by the locking portion and the locked portion locking together.

6. The seal member according to claim 5, wherein the crimping member includes a main body portion that crimps the sheath, and the locking portion is a locking piece that extends from the main body portion toward the cap, the locked portion is a receiving recession portion into which the locking piece is fitted, and rotation of the crimping member and the cap is prevented by the locking piece and the receiving recession portion locking together.

7. The seal member according to claim 5, wherein the crimping member includes a main body portion that crimps the sheath and is shaped as a tube having a C-shaped cross-section that conforms to an outer periphery of the sheath.

8. The seal member according to claim 5, wherein the crimping member includes a main body portion that crimps the sheath by being pressed so as to wrap around an outer periphery of the sheath.

* * * * *